US007560023B2

(12) United States Patent  
Miyazawa et al.

(10) Patent No.: US 7,560,023 B2  
(45) Date of Patent: Jul. 14, 2009

(54) METHOD OF MODIFYING SURFACE OF MATERIAL

(75) Inventors: Kazuyuki Miyazawa, Yokohama (JP); Taketoshi Kanda, Yokohama (JP); Yousuke Toujo, Yokohama (JP); Aya Ohkubo, Yokohama (JP); Osamu Shirota, Yokohama (JP); Kenichi Sakuma, Yokohama (JP); Masayoshi Wada, Yokohama (JP)

(73) Assignee: Shiseido Company, Ltd., Tokyo (JP)

( * ) Notice: Subject to any disclaimer, the term of this patent is extended or adjusted under 35 U.S.C. 154(b) by 470 days.

(21) Appl. No.: 10/536,066

(22) PCT Filed: Nov. 20, 2003

(86) PCT No.: PCT/JP03/14783

§ 371 (c)(1),  
(2), (4) Date: May 24, 2005

(87) PCT Pub. No.: WO2004/048492

PCT Pub. Date: Jun. 10, 2004

(65) Prior Publication Data

US 2006/0060533 A1     Mar. 23, 2006

(30) Foreign Application Priority Data

| Nov. 25, 2002 | (JP) | 2002-340320 |
| Nov. 25, 2002 | (JP) | 2002-340321 |
| Feb. 28, 2003 | (JP) | 2003-052305 |
| May 12, 2003 | (JP) | 2003-133418 |
| Jun. 13, 2003 | (JP) | 2003-169123 |

(51) Int. Cl.  
*B01D 15/08* (2006.01)

(52) U.S. Cl. .............. 210/198.2; 210/502.1; 210/635; 210/656

(58) Field of Classification Search .............. 210/198.2, 210/635, 656, 502.1; 502/401  
See application file for complete search history.

(56) References Cited

U.S. PATENT DOCUMENTS 4,830,921 A * 5/1989 Kitayama et al. ........... 428/406  
5,141,806 A * 8/1992 Koontz ..................... 428/315.5

(Continued)

FOREIGN PATENT DOCUMENTS

JP      59-169532 A     9/1984

(Continued)

OTHER PUBLICATIONS

PTO 07-4203 Translation of Japan Patent No. 62-258390.*

(Continued)

*Primary Examiner*—Ernest G Therkorn  
(74) *Attorney, Agent, or Firm*—Townsend & Banta

(57) ABSTRACT

A method for surface modification of a material by means of introducing the phosphorylcholine group represented by the following formula (1-1) onto the surface of the material by treating a material having amino groups with a chemical compound containing an aldehyde derivative obtained by the oxidative ring-opening reaction of glycerophosphorylcholine.

$$\text{\textasciitilde}O-\overset{O}{\underset{O^-}{\overset{\|}{P}}}-O-(CH_2)_n-\overset{R_1}{\underset{R_3}{\overset{|}{N^+}}}-R_2 \quad (1\text{-}1)$$

The method of the present invention provides various materials such as medical materials having superior biocompatibility and hydrophilicity.

1 Claim, 12 Drawing Sheets

U.S. PATENT DOCUMENTS

| | | | |
|---|---|---|---|
| 5,178,756 A * | 1/1993 | Jarrett et al. | 210/198.2 |
| 5,599,587 A * | 2/1997 | Bowers et al. | 427/322 |
| 5,866,387 A * | 2/1999 | Ogino et al. | 435/179 |
| 5,977,257 A * | 11/1999 | Waki et al. | 525/131 |
| 2006/0000758 A1* | 1/2006 | Wormsbecher | 210/198.2 |
| 2007/0084796 A1* | 4/2007 | Onishi et al. | 210/659 |
| 2007/0181503 A1* | 8/2007 | Maeno et al. | 210/656 |
| 2007/0241054 A1* | 10/2007 | Miyazawa et al. | 210/633 |

FOREIGN PATENT DOCUMENTS

| | | | |
|---|---|---|---|
| JP | 62-258390 | * | 11/1987 |
| JP | 62-258390 A | | 11/1987 |

OTHER PUBLICATIONS

PTO 08-2201 Translation of Japan Patent No. 14098676.*
PTO 08-2172 Translation of Japan Patent No. 08-2172.*
PTO 08-4047 Translation of Yamawaki (Japan Patent No. 59-169532).*
English translation of, and Japanese language version of, a Rejection issued in JP 2002-34021, mailed Nov. 2, 2004.
English translation of, and Japanese language version of, a Rejection issued in JP 2003-169123, mailed Nov. 2, 2004.

* cited by examiner

METHOD OF MODIFYING SURFACE OF MATERIAL

REFERENCE TO RELATED APPLICATIONS

This application is a 371 of PCT/JP03/14783 filed Nov. 20, 2003.

TECHNICAL FIELD

[1: Invention Defined by Surface Modication]

The present invention relates to a method for surface modification. The method for surface modification of the present invention is applied to various materials including polymers, ceramics, metals, and fibers; it can easily provide molded pieces and raw materials having a surface with superior biocompatibility and hydrophilicity and is useful for medical materials, cosmetic ingredients, chromatography packing materials, etc. It is also useful for modification of members of a separation analysis apparatus.

[2: Invention Defined by Modified Powder]

The present invention relates to a modified powder having a phosphorylcholine group on the surface and a method for manufacturing it. The modified powder of the present invention is superior in biocompatibility and moisture retention, and is useful in cosmetics, medical materials, chromatography packings, etc.

[3: Invention Defined by a Chromatography Packing]

The present invention relates to a chromatography packing. More specifically, it relates to a chromatography packing wherein the phosphorylcholine groups are chemically directly bonded to the carrier surface.

[4: Invention Defined by a Liquid Contact Member]

The present invention relates to a liquid-contacting member coated with a polymer having hydrophilic groups. More specifically, it relates to a liquid-contacting member of piping of an analytical apparatus and the like wherein the surface of said liquid-contacting member is firmly coated with a polymer having phosphorylcholine groups.

[5: Invention Defined by a Filter]

The present invention relates to a filter material. More specifically, it relates to a filter material wherein the phosphorylcholine groups are chemically directly bonded to the filter carrier surface.

BACKGROUND ART

[Invention Defined by a Surface Modication]

Polymers having phosphorylcholine groups have been researched as biocompatible polymers, and biocompatible materials prepared by coating various base agents with such polymers have been developed.

For example, Patent Document 1-1 discloses a cosmetic in which powder coated with a homopolymer or copolymer of 2-methacryloyloxyethyl phosphorylcholine is used as cosmetic powder to improve moisture retention and adhesion on the skin.

Also, Patent Document 1-2 and Patent Document 1-3 disclose medical materials and a separation medium coated with polymers having phosphorylcholine groups.

The surface of the aforementioned materials are coated with a polymer obtained by polymerizing monomers having the phosphorylcholine structure prepared by reacting an acrylic-type monomer mainly having hydroxyl groups with 2-chloro-1,3,2-dioxaphosphorane-2-oxide and then using trimethylamine to turn the reaction product into a quaternary ammonium (refer to Patent Documents 1-4 and 1-5 for the preparation method).

Patent Document 1-4 describes the preparation of a copolymer of 2-methacryloyloxyethyl phosphorylcholine and methacrylate, and Patent Document 1-5 describes the preparation of a homopolymer of 2-methacryloyloxyethyl phosphorylcholine.

Patent Document 1-1: Japanese Patent Laid-Open H7-118123 bulletin

Patent Document 1-2: Japanese Patent Laid-Open 2000-279512 bulletin

Patent Document 1-3: Japanese Patent Laid-Open 2002-98676 bulletin

Patent Document 1-4: Japanese Patent Laid-Open H9-3132 bulletin

Patent Document 1-5: Japanese Patent Laid-Open H10-298240 bulletin

However, depending on the shape of the material, it is difficult to effectively coat the entire surface of the material by using a method that modifies the surface by coating the material with a polymer having phosphorylcholine groups.

Also, the polymer coating peels off the material's surface and may cause problems in terms of durability. Furthermore, since the material's surface is coated with the polymer, the effects may go beyond the purpose of giving biocompatibility by using phosphorylcholine groups and the basic characteristics required of the material itself may be lost.

Also there is a problem in that the procedure is cumbersome because the aforementioned preparation method for the polymer used for coating requires strict anhydrous conditions. Furthermore, depending on the polymerization conditions, there may be a stability problem for the phosphorylcholine groups bonded to the coating polymer.

In view of the aforementioned description, the inventors conducted earnest research on a method for modifying the surface of various materials by using phosphorylcholine groups, and discovered that a material directly having phosphorylcholine groups on the surface and therefore having superior biocompatibility and hydrophilicity can be obtained with ease and in great versatility by the bond formation reaction on the surface of the material by reacting a compound containing phosphorylcholine groups and a material containing amino groups, rather than coating the material surface with a polymer having phosphorylcholine groups, thus completing the present invention.

The inventors also discovered that, even with a method in which the surface is modified by coating the material with a polymer, application of the method of the present invention described above after a specific polymer coating secures sufficient durability of the phosphorylcholine groups on the material's surface, compared with conventional methods in which the material is simply coated physically by a cast of a hydrophilic polymer. It was also discovered that, depending on the material (materials having a certain thickness made of metal, plastic, glass, etc. such as processed pieces and substrates), the method of the present invention can very easily give hydrophilicity and/or biocompatibility to the material while maintaining the basic properties required of the material, resulting in a material that can be effectively used as a material for a separation analysis apparatus and the like.

[2: Invention Defined by a Modified Powder]

Polymers having phosphorylcholine groups have been researched as biocompatible polymers, and biocompatible materials prepared by coating various base agents with such polymers have been developed.

For example, Patent Document 2-1 discloses a cosmetic in which powder coated with a homopolymer or copolymer of 2-methacryloyloxyethyl phosphorylcholine is used as cosmetic powder to improve moisture retention and adhesion on the skin.

Also, Patent Document 2-2 and Patent Document 2-3 disclose medical materials and a separation medium coated with polymers having phosphorylcholine groups.

The surface of the aforementioned materials are coated with a polymer obtained by polymerizing monomers having the phosphorylcholine structure prepared by reacting an acrylic-type monomer mainly having hydroxyl groups with 2-chloro-1,3,2-dioxaphosphorane-2-oxide and then using trimethylamine to turn the reaction product into a quaternary ammonium (refer to Patent Documents 2-4 and 2-5 for the preparation method).

Patent Document 2-4 describes the preparation of a copolymer of 2-methacryloyloxyethyl phosphorylcholine and methacrylate, and Patent Document 2-5 describes the preparation of a homopolymer of 2-methacryloyloxyethyl phosphorylcholine.

Patent Document 2-1: Japanese Patent Laid-Open H7-118123 bulletin

Patent Document 2-2: Japanese Patent Laid-Open 2000-279512 bulletin

Patent Document 2-3: Japanese Patent Laid-Open 2002-98676 bulletin

Patent Document 2-4: Japanese Patent Laid-Open H9-3132 bulletin

Patent Document 2-5: Japanese Patent Laid-Open No. H10-298240 bulletin

However it is difficult to effectively coat the entire surface of the powder surface by using a method that coats the surface with a polymer having phosphorylcholine groups. Also, the polymer coating peels off the powder and may cause problems in terms of durability. Furthermore, since the powder's surface is coated with the polymer, the effects may go beyond the purpose of giving biocompatibility by using phosphorylcholine groups and the basic characteristics required of the powder itself may be lost.

Also, there is a problem in that the procedure is cumbersome because the aforementioned preparation method for the polymer used for coating requires strict anhydrous conditions. Furthermore, depending on the polymerization conditions, there may be a stability problem for the phosphorylcholine groups bonded to the coating polymer.

In view of the aforementioned description, the inventors conducted earnest research on various materials having phosphorylcholine groups, and discovered that powder directly having phosphorylcholine groups on the surface can be obtained with ease and with great versatility by the bond formation reaction on the surface of the powder by reacting a compound containing phosphorylcholine groups and powder containing a functional group that reacts with this compound, rather than coating the powder surface with a polymer having phosphorylcholine groups, thus completing the present invention.

[3: Invention Defined by a Chromatography Packing]

Polymers containing phosphorylcholine groups have been researched as biocompatible polymers. Biocompatible materials that are various base agents coated with these polymers have been developed.

For example, Patent Document 3-1 describes medical materials coated with a polymer having phosphorylcholine groups. Also, Patent Document 3-2 describes a separation medium coated with a polymer having phosphorylcholine groups.

The surface of the aforementioned materials are coated with a polymer obtained by polymerizing monomers having the phosphorylcholine structure prepared by reacting an acrylic-type monomer mainly having hydroxyl groups with 2-chloro-1,3,2-dioxaphosphorane-2-oxide and then using trimethylamine to turn the reaction product into a quaternary ammonium (refer to Patent Documents 3-3 and 3-4 for the preparation method).

Patent Document 3-3 describes the preparation of a copolymer of 2-methacryloyloxyethyl phosphorylcholine and methacrylate, and Patent Document 3-4 describes the preparation of a homopolymer of 2-methacryloyloxyethyl phosphorylcholine.

On the other hand, there are many commercially available packings for GFC, which separates biological samples such as proteins and polypeptides that have smaller molecular weight than proteins by means of size exclusion. For the packings for GFC, there are packings that use cross-linked hydrophilic polymers as the carrier and packings that use silica gel as the carrier.

A packing that uses a cross-linked hydrophilic polymer as the carrier has a wide pH range for the migration phase and is highly versatile. However, compared with a packing that uses silica as the carrier, a packing that uses a polymer as the carrier is: (1) harder to obtain a higher theoretical plate number due to the difficulty of controlling the fine pore size, and (2) often times incapable of obtaining chromatograms with a good reproducibility due to an inferior strength against the high pressure applied when used for high-performance liquid chromatography (HPLC) and the swelling of the particles caused by the migration phase solvent.

A packing that uses silica gel as the carrier has a problem of adsorption of proteins and/or polypeptides onto the surface of the silica gel carrier. To address this problem, there are packings commercially available that use silica gel whose surface is modified with non-dissociative hydrophilic groups for the purpose of suppressing the adsorption of proteins and/or polypeptides in the analysis sample on the silica gel.

For example, Shodex PROTEIN KW-803 (product name) is commercially available from Showa Denko KK as a silica gel-type GFC column. This silica gel-type column is described in the catalogue as a silica gel-type GFC mode column suitable for analyzing proteins having a molecular weight of several thousands to a million.

Also, YMC-Pack Diol (product name) is commercially available from YMC Co. Ltd. This is also described as a silica gel-type GFC column prepared by chemically bonding functional groups having the diol structure to a silica gel carrier; it can be used to separate proteins having a molecular weight of ten thousand to several hundred thousand.

Patent Document 3-1: Japanese Patent Laid-Open 2000-279512 bulletin

Patent Document 3-2: Japanese Patent Laid-Open 2002-98676 bulletin

Patent Document 3-3: Japanese Patent Laid-Open H9-3132 bulletin

Patent Document 3-4: Japanese Patent Laid-Open H10-298240 bulletin

The object of the present invention is to provide a new packing for chromatography. When the packing for chromatography of the present invention is used for a GFC column, the adsorption of protein and/or polypeptides is very small and a higher separation ability is demonstrated.

[4: Invention Defined by a Liquid Contact Member]

A liquid-contacting member of piping of an analytical apparatus and the like is designed to prevent protein adsorption by means of coating with a common hydrophilic group. For example, Patent Document 4-1 describes a capillary column that is hard for proteins to adsorb onto, allows higher separation and higher reliability analysis, and is designed to have a longer life by means of the formation of a polymer film on the inside wall using a vinyl compound. Patent Document 4-2 describes an electrophoresis capillary tube that allows easy removal of proteins and has a long service life; this capillary tube has agarose bonded covalently to the inside wall of a capillary tube made of a silica base material. The description claims that successful separation of proteins with good reproducibility is achieved without degrading the separation efficiency and the service life can be extended. Patent Document 4-3 proposes apparatuses and materials for clinical testing in which adhesion/adsorption of proteins and platelets in blood is controlled; specifically, it discloses a plastic polypropylene Spitz tube whose surface is coated with a hydrophilic polymer such as vinyl alcohol.

Also, polymers having phosphorylcholine groups have been researched as biocompatible polymers, and biocompatible materials prepared by coating various base agents with such polymers have been developed. For example, Patent Document 4-4 and Patent Document 4-5 disclose medical materials and a separation medium coated with polymers having phosphorylcholine groups. These are prepared by synthesizing monomers having the phosphorylcholine structure and then coating the surface with the polymer obtained by polymerizing these monomers. For a method for manufacturing these polymers, Patent Document 4-6 describes the preparation of a copolymer of 2-methacryloyloxyethyl phosphorylcholine and methacrylate, and Patent Document 4-7 describes the preparation of a homopolymer of 2-methacryloyloxyethyl phosphorylcholine.

Patent Document 4-1: Japanese Patent Laid-Open H5-288716 bulletin
Patent Document 4-2: Japanese Patent Laid-Open H6-288984 bulletin
Patent Document 4-3: Japanese Patent Laid-Open S62-169052 bulletin
Patent Document 4-4: Japanese Patent Laid-Open 2000-279512 bulletin
Patent Document 4-5: Japanese Patent Laid-Open 2002-98676 bulletin
Patent Document 4-6: Japanese Patent Laid-Open H9-3132 bulletin
Patent Document 4-7: Japanese Patent Laid-Open H10-298240 bulletin The object of the present invention is to provide a liquid-contacting member coated with a polymer having hydrophilic groups; it provides a liquid-contacting member much more firmly coated with a hydrophilic polymer compared with a liquid-contacting member prepared by simply coating physically the surface of piping and such of an analytical apparatus by a cast of a hydrophilic polymer. Furthermore, the hydrophilic group is a phosphorylcholine group, which has a high protein adsorption prevention effect, and therefore a liquid-contacting member that allows protein analysis with a good reproducibility and a high recovery rate is provided.

Depending on the shape of the liquid-contacting member, effective or even coating on the entire inner wall surface is difficult when conventional technology is used wherein polymer having phosphorylcholine groups is obtained first and then this polymer is used to coat the liquid-contacting member to modify the surface.

Also, the polymer coating peels off the material's surface and may cause problems in terms of durability. There is also a problem in that the procedure is cumbersome because the monomer having a phosphorylcholine group has to be prepared under strict anhydrous conditions. Furthermore, depending on the polymerization conditions for this monomer, there is a stability problem for the phosphorylcholine groups bonded to the coating polymer.

In view of the description above, the present invention provides a method that is not cumbersome and gives superior stability of the phosphorylcholine group. That is, the present invention is a liquid-contacting member on whose surface phosphorylcholine groups are introduced by first carrying out very firm polymer coating using a polymer containing alkoxysilyl groups on the inner wall surface of the liquid-contacting member and then bonding a chemical compound containing phosphorylcholine groups, rather than coating the inner wall surface of the liquid-contacting member with a polymer prepared by polymerizing monomers having phosphorylcholine groups. Furthermore, the present invention is not selective about the choice of the material of the liquid-contacting member; it is highly versatile and can be applied to liquid-contacting members composed of materials such as metal, plastic, and glass.

[5: Invention Defined by a Filter]

The separation process using separation membranes has broadened its application range as industries developed and now it encompasses a wide range including production of ultra-pure water for the semiconductor industry, removal of molds in the food industry, separation of oil and emulsion in the chemical industry, and concentration, separation, and purification of physiologically active substances in the medical drug industry.

Particularly in recent years, separation and purification of proteins and the like in the biochemical field has become important for the prospering bioindustry; and membranes having a higher fractionation efficiency and superior durability are in demand.

The methods to separate proteins are largely divided into separation by precipitation, separation by adsorption, and separation in solutions; separation by adsorption uses various kinds of chromatography, the separation in solutions uses gel filtration, electrophoresis, liquid-phase distribution method, membrane separation method, etc.; of these, the membrane separation method is known to be a method that quickly and easily separates proteins.

The membrane separation method is generally classified, by the size of the target substance for separation, into the precise filtration method, the ultrafiltration method, the dialysis method, the electrodialysis method, the reverse osmosis method, and the gas separation method. Their definitions according to the IUPAC are as follows: Microfiltration (acronym MF): a process in which particles and polymers larger than 0.1 micrometers are blocked; ultrafiltration (UF): a process in which particles and polymers within the range of 0.1 micrometers to 2 nanometers are blocked; nanofiltration (NF): a process in which particles and polymers smaller than 2 nanometers are blocked; reverse osmosis (RO): a process in which, due to the applied pressure, the solvent migrates in the direction opposite to the osmotic pressure difference.

Conventional filter materials have a problem in that proteins, oils/fats, and the like were adsorbed on the membrane surface and the filter's separation characteristics, particularly the membrane transport flow rate, decrease (refer to Non-patent Document 1).

As the target substance for separation becomes smaller, the filter precision becomes more important; with conventional separation membranes, it is very difficult to separate between proteins with similar sizes due to the limitation of fractionation characteristics and such of the membrane.

Polymers containing phosphorylcholine groups have been researched as biocompatible polymers. Biocompatible materials that are various base agents coated with these polymers have been developed.

Patent Document 5-1 describes the preparation of a copolymer of 2-methacryloyloxyethyl phosphorylcholine and methacrylate, and Patent Document 5-2 describes the preparation of a homopolymer of 2-methacryloyloxyethyl phosphorylcholine.

Patent Document 5-3 describes medical materials coated with a polymer having phosphorylcholine groups.

Patent Document 5-4 discloses a separation medium coated with a polymer having phosphorylcholine groups.

The surface of the aforementioned materials are coated with a polymer obtained by polymerizing monomers having the phosphorylcholine structure prepared by reacting an acrylic-type monomer mainly having hydroxyl groups with 2-chloro-1,3,2-dioxaphosphorane-2-oxide and then using trimethylamine to turn the reaction product into a quaternary ammonium (refer to Patent Documents 5-1 and 5-2 for the preparation method).

This method simply coats the surface physically with a polymer having the phosphorylcholine structure and therefore the evenness and durability of the coating film is hardly sufficient.

Also, in order to improve the fractionation characteristics, it is desirable for the filter to have homogeneous pores controlled at the nano level.

A known example of inorganic materials that have homogeneous pores controlled at the nano level is porous alumina prepared by the anode oxidation of aluminum wherein the anode oxidation conditions are strictly controlled in an acidic bath.

Non-patent Document 5-2 reports formation of an alumina structure having homogeneous pores in the range of 5-500 nm by using sulfuric acid, oxalic acid, and phosphoric acid for the acidic electrolysis bath and controlling the anode oxidation voltage according to the type of the acid.

As described above, there have been various researches aimed at controlling the adsorption of proteins on the filter; however, it has been limited in terms of the filter materials, pore size and such, and no filter useful for wider applications has been developed yet.

Patent Document 5-1: Japanese Patent Laid-Open H9-3132 bulletin

Patent Document 5-2: Japanese Patent Laid-Open H10-298240 bulletin

Patent Document 5-3: Japanese Patent Laid-Open H2000-279512 bulletin

Patent Document 5-4: Japanese Patent Laid-Open 2002-98676 bulletin

Non-patent document 5-1: Nakagaki, Masayuki, ed., Membrane Treatment Technology System, vol. 1 of 2, Fuji Techno System, p 259

Non-patent document 5-2: Masuda, Hideki, Chemistry and Education, Vol. 47-8 (1999), p 520

The object of the present invention is to provide a new filter material. Also, the present invention discloses a method for manufacturing a filter for which protein adsorption is suppressed. The filter material of the present invention is useful for separation and concentration of antibodies, enzymes and the like, as well as for filtration of a wide range of biological substances, e.g. filters for blood dialysis.

According to the present invention, filter materials with very little adsorption of proteins and polypeptides can be provided.

DISCLOSURE OF INVENTION

[Invention Defined by Surface Modification]

That is, the present invention provides a method for surface modification of a material by means of introducing the phosphorylcholine group represented by the following formula (1-1) to the surface of the material by treating a material having amino groups with a chemical compound containing an aldehyde derivative obtained by the oxidative ring-opening reaction of glycerophosphorylcholine.

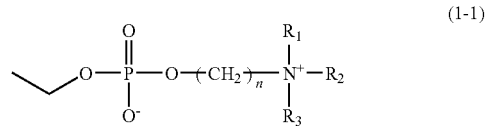
(1-1)

($R_1$, $R_2$, and $R_3$ each independently denote a straight chain or branched chain alkyl group having 1-6 carbon atoms. $n=2-4$.)

Also, the present invention provides the aforementioned method for surface modification of a material wherein said formula (1-1) is the following formula (1-2).

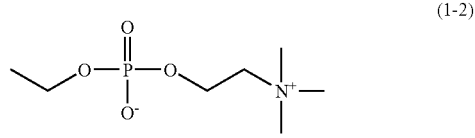
(1-2)

Furthermore, the present invention provides a method for surface modification of a material by means of introducing the phosphorylcholine group represented by the following formula (1-1) to the surface of the material; said method comprising a step in which amino groups are introduced to the material and a step in which said material is treated with a chemical compound containing an aldehyde derivative obtained by the oxidative ring-opening reaction of glycerophosphorylcholine.

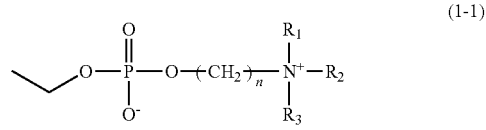
(1-1)

($R_1$, $R_2$, and $R_3$ each independently denote a straight chain or branched chain alkyl group having 1-6 carbon atoms. $n=2-4$.)

Also, the present invention provides the aforementioned method for surface modification of a material wherein said formula (1-1) is the following formula (1-2).

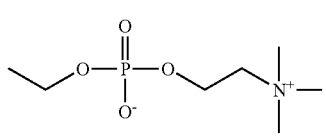
(1-2)

Furthermore, the present invention provides a method for surface modification of a material by means of introducing the phosphorylcholine group represented by the following formula (1-2) to the surface of the material by coating the surface of the material with a polymer containing alkoxysilyl groups, followed by bonding of the phosphorylcholine-containing compound represented by the following formulas (1-3) and/or (1-4) through the reductive amination reaction or condensation reaction.

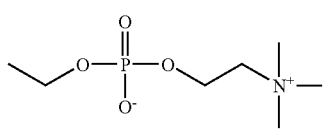
(1-2)

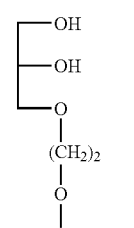
(1-3)

(1-4)

Also, the present invention provides the aforementioned method for surface modification of a material wherein said polymer containing alkoxysilyl groups is a polymer obtained by copolymerizing the monomer represented by the following formula (1-5) and at least one of the monomers represented by formulas (1-6)-(1-8).

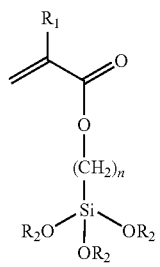
(1-5)

($R_1$ denotes a hydrogen atom or a straight chain or branched chain alkyl having 1-6 carbon atoms, $R_2$ denotes a straight chain or branched chain alkyl having 1-6 carbon atoms, and n is a number 1-6.)

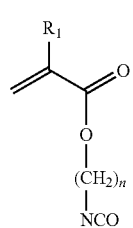
(1-6)

($R_1$ denotes a hydrogen atom or a straight chain or branched chain alkyl having 1-6 carbon atoms, and n is a number 1-6. —NH— can be used in place of —O—.)

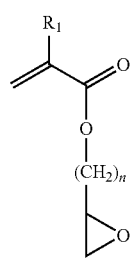
(1-7)

($R_1$ denotes a hydrogen atom or a straight chain or branched chain alkyl having 1-6 carbon atoms, and n is a number 1-6. —NH— can be used in place of —O—.)

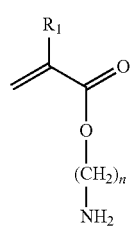
(1-8)

($R_1$ denotes a hydrogen atom or a straight chain or branched chain alkyl having 1-6 carbon atoms, and n is a number 1-6. —NH— can be used in place of —O—.)

Furthermore, the present invention provides a method for surface modification of a material by means of introducing the phosphorylcholine group represented by the following formula (1-1) to the surface of the material by coating the surface of the material with a copolymer of the monomer represented by the following formula (1-5) and a (meth) acrylic acid type monomer, followed by bonding of the phosphorylcholine-containing compound.

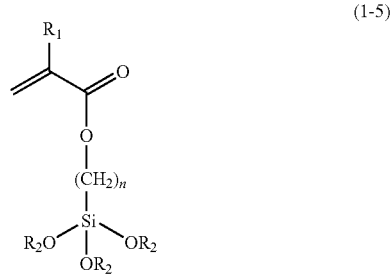

(1-5)

($R_1$ denotes a hydrogen atom or a straight chain or branched chain alkyl having 1-6 carbon atoms, $R_2$ denotes a straight chain or branched chain alkyl having 1-6 carbon atoms, and n is a number 1-6.)

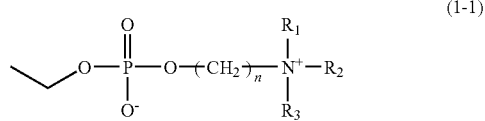

(1-1)

($R_1$, $R_2$, and $R_3$ each independently denote a straight chain or branched chain alkyl group having 1-6 carbon atoms. n=2-4.)

[2: Invention Defined by a Modified Powder]

That is, the present invention provides modified powder that has on its surface a phosphorylcholine group represented by the following formula (2-1).

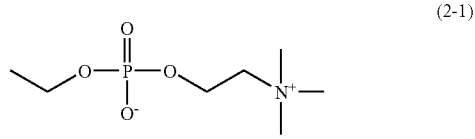

(2-1)

Also, the present invention provides a method of manufacturing the aforementioned modified powder by means of adding an aldehyde derivative obtained by the oxidative ring-opening reaction of glycerophosphorylcholine to powder having amino groups.

Furthermore, the present invention provides a method for manufacturing the aforementioned modified powder; said method comprising a step in which amino groups are introduced to the powder surface and a step in which a chemical compound containing an aldehyde derivative obtained by the oxidative ring-opening reaction of glycerophosphorylcholine is added to said powder.

[3: Invention Defined by a Chromatography Packing]

That is, the present invention provides a chromatography packing wherein the phosphorylcholine groups, represented by the following formula (3-1), are chemically directly bonded to the carrier surface.

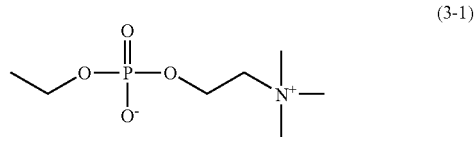

(3-1)

Furthermore, the present invention provides the aforementioned chromatography packing characteristically obtained by means of directly introducing amino groups to the surface of the carrier and then reacting an aldehyde derivative obtained by the oxidative ring-opening reaction of glycerophosphorylcholine with said amino groups.

Furthermore, the present invention provides the aforementioned chromatography packing wherein said carrier is spherical porous silica gel.

Furthermore, the present invention provides the aforementioned chromatography packing wherein the average particle size of said spherical porous silica gel is 1-200 micrometers.

Furthermore, the present invention provides the aforementioned chromatography packing wherein the average pore size of said spherical porous silica gel is 10-50 angstroms.

[4: Invention Defined by a Liquid Contact Member]

That is, the present invention provides a liquid-contacting member wherein the phosphorylcholine group represented by the following formula (4-1) is introduced onto a piping whose surface is coated with an alkoxysilyl group-containing polymer.

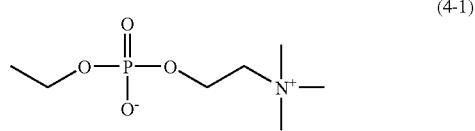

(4-1)

Furthermore, the present invention provides the aforementioned liquid-contacting member wherein the phosphorylcholine-containing compound represented by the following formulas (4-2) and/or (4-3) is bonded to a liquid-contacting member whose surface is coated with an alkoxysilyl group-containing polymer.

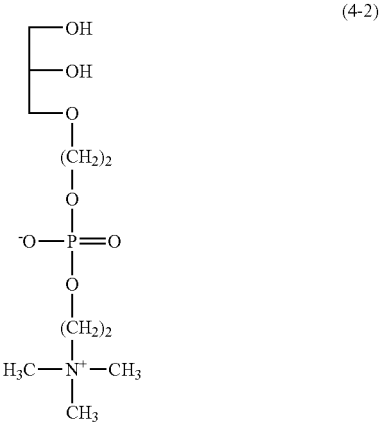

(4-2)

-continued

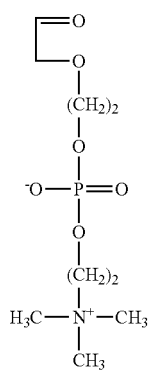
(4-3)

Furthermore, the present invention provides the aforementioned liquid-contacting member wherein said polymer containing alkoxysilyl groups is a polymer obtained by copolymerizing the monomer represented by the following formula (4-4) and at least one of the monomers represented by formulas (4-5)-(4-7).

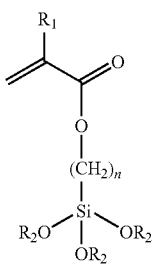
(4-4)

($R_1$ denotes a hydrogen atom or a straight chain or branched chain alkyl having 1-6 carbon atoms, $R_2$ denotes a straight chain or branched chain alkyl having 1-6 carbon atoms, and n is a number 1-6.)

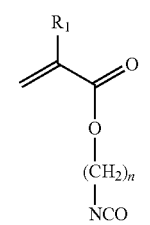
(4-5)

($R_1$ denotes a hydrogen atom or a straight chain or branched chain alkyl having 1-6 carbon atoms, and n is a number 1-6. —NH— can be used in place of —O—.)

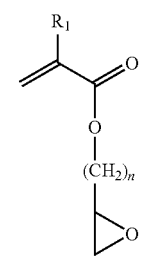
(4-6)

($R_1$ denotes a hydrogen atom or a straight chain or branched chain alkyl having 1-6 carbon atoms, and n is a number 1-6. —NH— can be used in place of (—O—.)

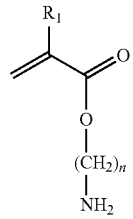
(4-7)

($R_1$ denotes a hydrogen atom or a straight chain or branched chain alkyl having 1-6 carbon atoms, and n is a number 1-6. —NH— can be used in place of —O—.)

Also, the present invention provides the aforementioned liquid-contacting member wherein said liquid-contacting member is a piping for a separation analysis apparatus.

[5: Invention Defined by a Filter]

That is, the present invention provides a filter material wherein the phosphorylcholine groups, represented by the following formula (5-1), are chemically directly bonded to the filter carrier surface.

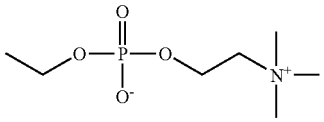
(5-1)

Also, the present invention provides the aforementioned filter material characteristically obtained by means of introducing amino groups to the surface of the filter carrier and then reacting an aldehyde derivative obtained by the oxidative ring-opening reaction of glycerophosphorylcholine with said amino groups.

Furthermore, the present invention provides the filter material wherein said filter carrier is composed of an inorganic material having hydroxyl groups on its surface.

Furthermore, the present invention provides the filter material wherein said filter carrier is a borosilicate glass fiber filter.

Also, the present invention provides the filter material wherein said filter carrier is obtained by the anode oxidation of aluminum in an acidic electrolyte solution and has homogeneous fine pores vertical to the filter plane.

Furthermore, the present invention provides the filter material wherein the filter carrier is prepared by using an alumina base substance as a template for transferring.

BEST MODE FOR CARRYING OUT THE INVENTION

Figure 1:
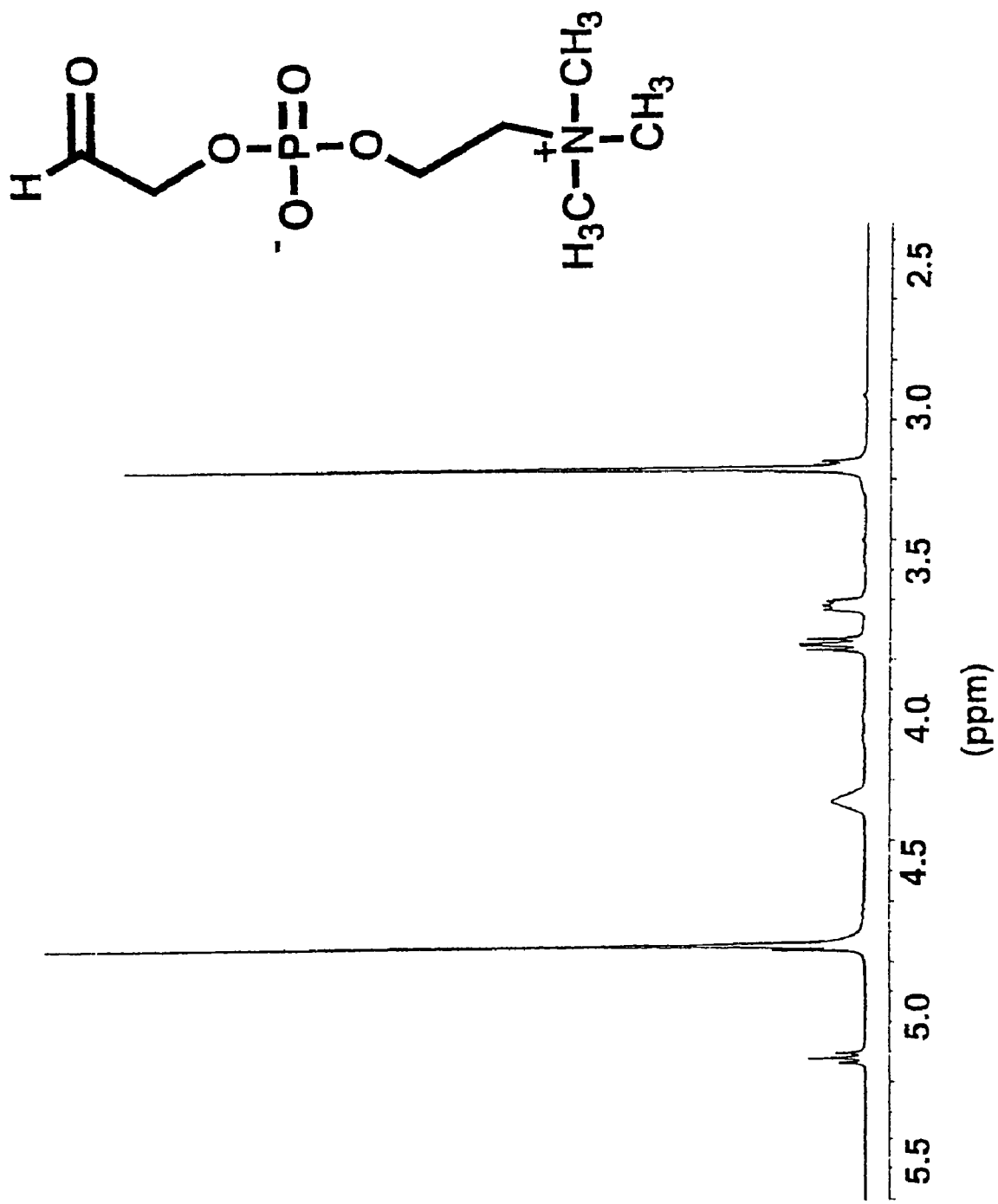
FIG. 1 shows a structural formula and NMR spectrum of Synthesis example 1.

The present invention is described in detail below.

[Invention Defined by Surface Modification]

The selection of the material for the surface treatment according to the method of the present invention is not limited. For example, various materials composed of polymers, ceramics, or metals can be treated preferably. Examples of the preferably treated polymer material include resin molded pieces, fiber, film, sheets, fabric, non-woven fabric, and powder; they are used as final products, intermediate processed pieces, or raw materials; they can have any shape. The same can be said for the materials composed of ceramics or metals. Preferably treated are ceramic or metal processed pieces and/or ceramic or metal powder.

The material to be treated must have amino groups on its surface. For materials that do not have amino groups, a prior art method or a method developed in the future will be used to introduce amino groups. The amino groups are primary amines or secondary amines.

Examples of the method for introducing amino groups follow:

1. Introduction of Amino Groups by Means of the Surface Reaction of the Plasma Treatment Amino groups are introduced to the material surface by means of low temperature plasma in a nitrogen atmosphere. Specifically, the material is put into a plasma reactor vessel and, after a vacuum pump is used to form a vacuum in the reactor vessel, nitrogen gas is introduced. Amino groups can be then introduced onto the material surface by means of glow discharge. For example, amino groups are preferably introduced to materials such as fluorocarbon resin, various metals (stainless steel, titanium alloy, aluminum, iron, etc.), ceramics, carbon-type materials, various polymers (urethane, polycarbonate, polyimide, acrylic type, vinyl type, polysaccharides, polyalkylsiloxane, etc.), organic-inorganic complex type materials, and various inorganic materials (mica, talc, kaolin, alumina, titanium oxide, zinc oxide, iron oxide, various inorganic pigments, etc.).

This method provides a material wherein amino groups are directly bonded to the material surface rather than coating the material surface with a substance such as a polymer and forming a complex. Therefore, the functions the material are not degraded other than the fact that the phosphorylcholine group is introduced.

2. Introduction of Amino Groups by Means of Plasma Polymerization

Radicals are generated on the material surface by means of a plasma treatment. The material surface is then treated with monomers to polymerize so as to introduce the amino groups. For example, a polylactic acid film is put into a plasma reactor vessel and, after forming a vacuum in the vessel, radicals are generated on the film surface by means of electric discharge. The film is then taken out of the vessel and soaked in a nitrogen-substituted THF (tetrahydrofuran) solution of allylamine to initiate graft polymerization.

For the monomer to treat the material, an amine-type monomer can be used. The amine-type monomer is not limited to allylamine as long as it has a reactive site such as polymerizable vinyl and acrylate, and an amino group. The amino group can be protected by a butoxycarbonyl group, benzyloxycarbonyl group or the like.

In addition to an amine-type monomer, a monomer having a functional group such as an epoxy group, to which an amino group can be easily introduced by means of, for example, a reaction with diamine, can be use as well.

References related to the plasma treatment are shown below:

1. M. Muller, C. oehr Plasma amino functionalisation of PVDF microfiltration membranes: comparison of the in plasma modifications with a grafting method using ESCA and an amino-selective fluorescent probe Surface and Coatings Technology 116-119 (1999) 802-807
2. Lidija Tusek, Mirko Nitschke, Carsten Werner, Karin Stana-Kleinschek, Volker Ribitsch Surface characterization of NH3 plasma treated polyamide 6 foils Colloids and Surfaces A: Physicochem. Eng. Aspects 195 (2001) 81-95
3. Fabienne Poncin-Epaillard, Jean-Claude Brosse, Thierry Falher Reactivity of surface groups formed onto a plasma treated poly (propylene) film Macromol. Chem. Phys. 200. 989-996 (1999)

3. Introduction of Amino Groups by Means of a Surface Modifier

The surface of silanol-containing powder, titanium oxide powder or the like is treated with a surface modifier having amino groups, such as alkoxysilane, chlorosilane, and silazane.

For example, silica powder is treated with 3-aminopropyltrimethoxysilane, which has a primary amino group, to introduce amino groups. Specifically, silica is soaked in a mixed solution of water and 2-propanol, and, after adding 3-aminopropyltrimethoxysilane, the temperature is raised to 100° C. and the reaction is carried out for six hours. After cooling down to room temperature, silica is rinsed with methanol and dried to obtain a powder that has amino groups directly introduced onto the silica surface. In addition to silica, examples of the materials preferably treated with this method include molded pieces and powder composed of glass, alumina, talc, clay, aluminum, iron, mica, asbestos, titanium oxide, zinc flower, and iron oxide.

This method provides a material wherein amino groups are directly bonded to the functional groups on the material surface without having the material surface coated with a substance such as a polymer and thus resulting in formation of a complex. Therefore, the functions of the material are not degraded other than the fact that the phosphorylcholine group is introduced.

4. Introduction of Amino Groups by Means of the Silicone Vapor Phase Treatment (Refer to Japanese Patent Publication No. H1-54379, Japanese Patent Publication No. H1-54380 Bulletin, and Japanese Patent Publication No. H1-54381 Bulletin.)

The powder surface is treated with 1.3.5.7-tetramethylcyclotetrasiloxane and then Si—H groups introduced onto the surface are reacted with monomers having an amino group to obtain an aminated surface. For example, mica and 1.3.5.7-tetramethylcyclotetrasiloxane are put into a desiccator and an aspirator is used to deaerate it. The reaction is carried out for 16 hours at 80° C., and the mica is taken out and dried at 120° C. The obtained mica is dispersed in ethanol, to which allylamine is added, and an ethanol solution of chloroplatinic acid is added, followed by two hours of stirring at 60° C. After the reaction is completed, filtration, ethanol rinsing, and reduced-pressure drying is carried out to obtain aminated mica. Examples of powders that can be preferably treated with this method include fluorocarbon resin, various metals (stainless steel, titanium alloy, aluminum, iron, etc.), ceramics, carbon-type materials, various polymers (urethane, polycarbonate, polyimide, acrylic type, vinyl type, polysaccharides, polyalkylsiloxane, etc.), organic-inorganic complex type materials, and various inorganic materials (mica, talc, kaolin, alumina, titanium oxide, zinc oxide, iron oxide, various inorganic pigments, etc.).

For the monomer to be used in this method, an amine-type monomer can be used. The amine-type monomer is not limited to allylamine as long as it has a reactive site such as polymerizable vinyl and acrylate, and an amino group. The amino group can be protected by a butoxycarbonyl group, benzyloxycarbonyl group or the like.

In addition to an amine-type monomer, a monomer having a functional group such as an epoxy group, to which an amino group can be easily introduced by means of, for example, a reaction with diamine, can be used as well.

An aldehyde derivative or hydrate derivative obtained by the oxidative ring-opening reaction of glycerophosphorylcholine is used in the reductive amination reaction to directly add phosphorylcholine groups to the surface of the material to which amino groups have been introduced as described above.

Specifically, the material is soaked in methanol, to which phosphatidylglyceroaldehyde is added, and the mixture is left alone for six hours at room temperature. Sodium cyanoborate is then added at 0° C., followed by overnight heating and stirring, to add a phosphorylcholine group to an amino group. The powder is rinsed with methanol and dried to obtain a surface-modified material that has phosphorylcholine groups directly on the surface. For the reaction solvent, protogenic solvents such as water, ethanol, and 2-propanol can be used in addition to methanol; the introduction rate tends to be higher when methanol is used.

A scheme of a method in which 3-aminopropyltrimethoxysilane is used as the surface modifier to introduce phosphorylcholine groups (hereafter abbreviated as "PC groups") is described below.

Step 1 [Aminopropylation of the silica surface (common technique)]

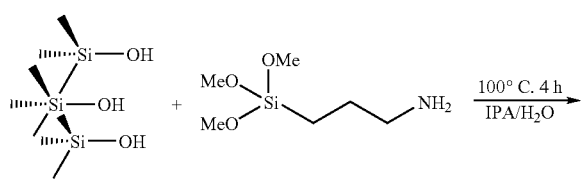

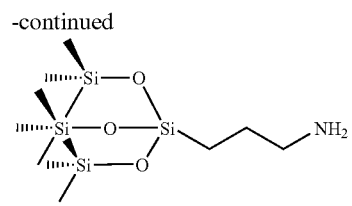

Step 2 [Introduction of PC]

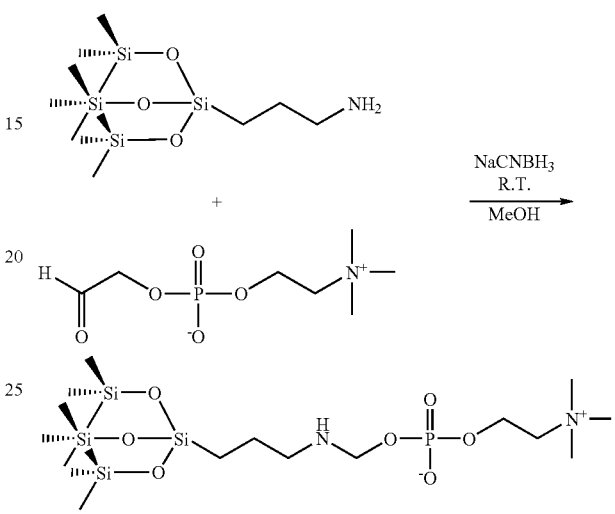

The surface modification method of the present invention has the following great advantages: the introduction rate of the phosphorylcholine group is high, the amount to be introduced can easily be adjusted, and the surface of various materials can be modified.

In the method of the present invention, the compound containing the aldehyde derivative obtained by the oxidative ring-opening reaction of glycerophosphorylcholine is obtained by oxidative ring-opening of the prior art glycerophosphorylcholine group by means of a prior art method, which is a very easy step. This reaction uses periodic acid or periodate to oxidize 1,2-diol to open the bond and obtain two aldehyde derivatives; in this particular method, a phosphorylcholine aldehyde derivative and formaldehyde are produced. The reaction is usually carried out in water or in an organic solvent containing water. The reaction temperature is between 0° C. to room temperature. The aldehyde derivative may go through an equilibrium reaction in water to become a hydrate, but this does not affect the subsequent reaction with the amine. A scheme for preparing a monofunctional aldehyde derivative containing a phosphorylcholine group is described below.

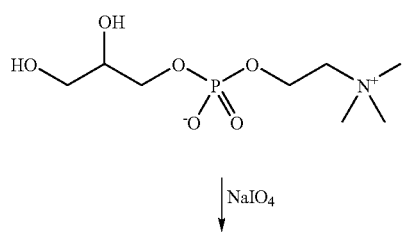

-continued

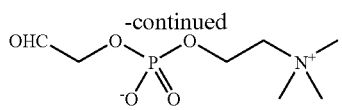

Selection of the material having amino groups is not limited in particular. It is sufficient if there are amino groups with which the aldehyde derivative obtained by the oxidative ring-opening reaction of glycerophosphorylcholine can react on the material surface, or in some cases on the inside surface of a material of complex shape.

The reductive amination reaction for bonding the aldehyde derivative (or hydrate derivative) obtained by the oxidative ring-opening reaction of glycerophosphorylcholine to the amino groups of the material surface can be carried out easily by stirring both of them in a solvent. This reaction is carried out by dissolving these two in water or alcohol (a third organic solvent ingredient can be mixed in, too) to form an imine and reducing it with a reducing agent to obtain a secondary amine. For the reducing agent, a mild reducing agent such as sodium cyanoboronate is preferable, but other reducing agents can be used as long as the phosphorylcholine is stable. The reaction is usually carried out at 0° C. to room temperature, but heating may be done depending on the situation.

Using the aforementioned method, a material containing a desired amount of hydrophilic phosphorylcholine groups is easily obtained.

While the description above is a means to introduce the phosphorylcholine group represented by formula (1-2), a material containing the phosphorylcholine group represented by general formula (1-1) can also be obtained in the same manner as described above. A chemical compound having a phosphorylcholine group represented by general formula (1-1) can be prepared from a prior art chemical compound by using a prior art method; the same reaction used to synthesize the compound having the phosphorylcholine group represented by formula (1-2) can be used for the preparation. Formula (1-2) is the best embodiment of general formula (1-1) wherein $R_1$, $R_2$, and $R_3$ are methyl groups and n=2.

In this specification, $R_1$, $R_2$, and $R_3$ in general formula (1-1) each independently denotes a straight chain or branched chain alkyl group having 1-6 (preferably 1-3) carbon atoms; and n=2-4. This straight chain or branched chain alkyl group may have another substituent; for example, a straight chain or branched chain alkyl group having a hydroxyl group is also preferable.

When the material is a synthetic polymer, its hydrophilic portion may include a carboxylate group, hydroxyl group, primary-tertiary amine group, sulfonate group, phosphate group, polyoxyethylene group, ammonium group, amide, carboxybetaine, and saccharide, and the type and content of these in the material can be adjusted to design its functions. As for the hydrophobic portion, depending on the application, straight chain or branched alkyls having 2-22 carbon atoms, cyclic alkyls such as cholesterol, alkyl groups containing unsaturated bonds such as oleyl, hydrocarbon type aromatics such as benzene rings, naphthalene rings, and pyrene, hetero type aromatics such as pyridine rings, imidazole, thiazole, and indole, and hydrophobic groups such as perfluoroalkyl and polyalkylsiloxane can be contained; the selection can be made based on the application of the material. The hydrophobic group of the material composed of the synthetic polymer can bond directly to the polymer main chain with the ester, ether, amide, urethane, or urea bond, or indirectly via a spacer. Examples of the spacer include hydrophilic polyethyleneoxide and hydrophobic polypropyleneoxide and straight chain alkyls having 2-22 carbon atoms.

Also, a modified material that manifests new functions can be designed by modifying some of the amino groups on the material surface with phosphorylcholine groups and the rest with other functional groups. The quantity of the amino groups introduced to the material is determined by means of elemental analysis and the like, and then a desired quantity of the compound containing the aldehyde derivative obtained by the oxidative ring-opening reaction of glycerophosphorylcholine is used to prepare the modified material]. After this, any functional groups can be added to the rest of the amino groups. This technique can be used generally for any powder.

The material whose surface is modified with the modification method of the present invention becomes a material and molded piece having superior biocompatibility and hydrophilicity. This material can be used as a material having biocompatible phosphorylcholine groups directly on its surface in wide applications such as cosmetics, medical materials (artificial organs, surgical tools, etc.), chromatography packings, and paints.

Another embodiment of the present invention is a modification method wherein a specific polymer coating is applied to the aforementioned modification method. Even a method in which the surface is modified by coating the material with the polymer of the present invention can sufficiently secure the durability of the phosphorylcholine group on the material surface, compared with a conventional method in which the surface is merely physically coated by means of casting of a hydrophilic polymer. Materials preferably modified with this embodiment are materials having a certain thickness such as manufactured material goods and substrate materials made of metal, plastic, glass, etc. The method of the present invention can very easily provide hydrophilicity and biocompatibility while maintaining the basic characteristics required of the material; it can be effectively used as a method to modify materials of separation analytical apparatuses and their piping and parts. For example, it is useful as a method to modify members that touch sample liquids, such as detector cells, sample vials, sampling needles, piping connectors, piping, etc. for separation or analytical apparatuses; materials for connecting piping of HPLC, MS, and NMR and capillary piping for electrophoresis apparatuses are particularly preferable for this modification method. Such materials include Teflon (registered trademark) tubes, Tefzel tubes, PEEK resin tubes, and fused silica tubes.

The selection of the alkoxysilyl group-containing polymer is not limited as long as the material can be coated with it. A strong film is formed on the surface of the coated material by means of the cross-linking reaction of alkoxysilane. For example, preferable is a (meth)acrylic-type monomer such as (meth)acrylic acid and (meth)acrylic alkyl ester that has alkoxysilyl group substitution; it can be a prior art monomer or a monomer to be developed in the future. Specifically, a polymer prepared by polymerizing the alkoxysilyl group-containing (meth)acrylic-type monomer represented by the following general formula (1-5) is dissolved in a solvent to treat the surface of the material and coating is carried out by means of cross-linking with a conventional method.

(1-5)

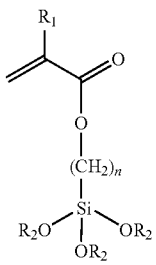

($R_1$ denotes a hydrogen atom or a straight chain or branched chain alkyl having 1-6 carbon atoms, $R_2$ denotes a straight chain or branched chain alkyl having 1-6 carbon atoms, and n is a number 1-6.)

In order to introduce the phosphorylcholine group represented by the following formula (1-1), preferably formula (1-2), the alkoxysilyl group-containing polymer to coat the material must have some kind of reactive group that reacts with a phosphorylcholine group-containing chemical compound. A preferable reactive group is an amino group. The amino group can be a primary amine or secondary amine. The amino groups can be introduced by using a prior art method or a method to be developed in the future. The easiest and most preferable method is to use a copolymer that is copolymerized with an amine-type monomer having an amino group and/or a monomer that has an epoxy group and/or an isocyanate group that generates an amino group.

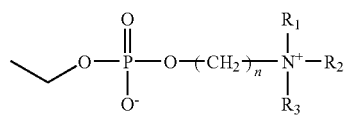

(1-1)

($R_1$, $R_2$, and $R_3$ each independently denote a straight chain or branched chain alkyl group having 1-6 carbon atoms. n=2-4.)

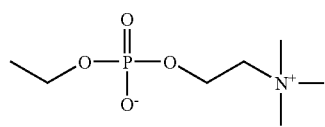

(1-2)

A copolymer with an amine-type monomer is not the only choice; a monomer having a functional group, such as an epoxy group and isocyanate group, to which an amino group can easily be introduced by means of a reaction with diamine and the like, and an alkoxysilyl group-containing polymer can be copolymerized and the resulting polymer can be used.

Using plasma polymerization, an alkoxysilyl group-containing polymer can be immersed in a nitrogen-substituted THF (tetrahydrofuran) solution of allylamine to initiate graft polymerization to introduce amino groups.

Preferable monomers to be copolymerized are the monomers represented by the following formulas (1-6)-(1-8) and a (meth)acrylic monomer such as acrylic acid and methacrylic acid. The ester bonds (COO) in formulas (1-6)-(1-8) can also be an amide bond (CONH).

The amino group in formula (1-8) can be protected by any protective group. For example, it can be protected by butoxycarbonyl or benzyloxycarbonyl. When the amino group is protected, the deprotection treatment (a trifluoroacetic acid treatment for the butoxycarbonyl and a palladium catalyst treatment in a hydrogen atmosphere for the benzyloxycarbonyl) is carried out before introducing the phosphorylcholine group (PC group).

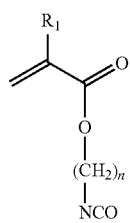

(1-6)

($R_1$ denotes a hydrogen atom or a straight chain or branched chain alkyl having 1-6 carbon atoms, and n is a number 1-6. —NH— can be used in place of —O—.)

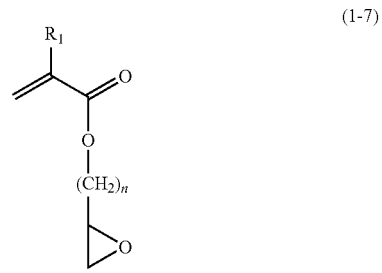

(1-7)

($R_1$ denotes a hydrogen atom or a straight chain or branched chain alkyl having 1-6 carbon atoms, and n is a number 1-6. —NH— can be used in place of —O—.)

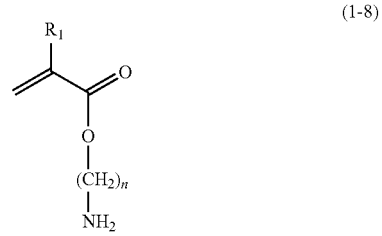

(1-8)

($R_1$ denotes a hydrogen atom or a straight chain or branched chain alkyl having 1-6 carbon atoms, and n is a number 1-6. —NH— can be used in place of —O—.)

For the monomer for copolymerization, in addition to the monomers having bonding functional groups as described above, other monomers can also be preferably used for copolymerization for the sake of the affinity between the material and the alkoxysilyl group-containing polymer for the coating, depending on the properties of the material. For example, when the material is composed of polypropylene, butylmethacrylate can be used to improve the affinity with the saturated carbon; similarly, polydimethylsiloxanemethacrylate for polysiloxane-type materials, and perfluoroalkyl monomers for Teflon (registered trademark) can be used for copolymerization to improve the effect.

A phosphorylcholine group-containing chemical compound, preferably an aldehyde derivative or hydrate derivative obtained by the oxidative ring-opening reaction of glycerophosphorylcholine, is used in the reductive amination reaction to introduce phosphorylcholine groups to the amino groups introduced as described above. Preferable phosphorylcholine group-containing chemical compounds are the diol derivatives represented by the following formula (1-3) and/or the aldehyde derivatives represented by the following formula (1-4); bonding to the amino group is preferably carried out by means of a condensation reaction and/or reductive amination reaction.

As long as the final phosphorylcholine group-containing chemical compound is bonded to the amino group, any reaction path can be taken from the introduction of the amino group to the bonding.

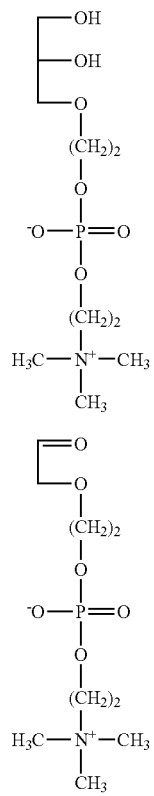

(1-3)

(1-4)

The aldehyde derivative obtained by the oxidative ring-opening reaction of glycerophosphorylcholine is obtained by oxidative ring-opening of the prior art glycerophosphorylcholine group by means of a prior art method, which is a very easy step. This reaction uses periodic acid or periodate to oxidize 1,2-diol to open the bond and obtain two aldehyde derivatives; in this particular method, a phosphorylcholine aldehyde derivative and formaldehyde are produced. The reaction is usually carried out in water or in an organic solvent containing water. The reaction temperature is between 0° C. to room temperature. The aldehyde derivative may go through equilibrium reaction in water to become a hydrate, but this does not affect the subsequent reaction with the amine. A scheme for preparing a monofunctional aldehyde derivative containing a phosphorylcholine group is described below.

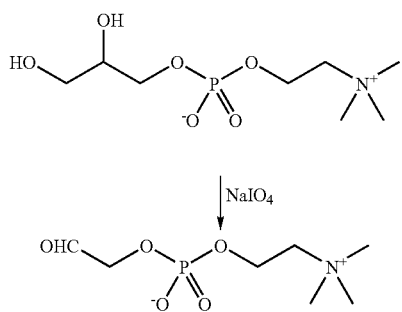

The reductive amination reaction for bonding the aldehyde derivative and/or hydrate derivative obtained by the oxidative ring-opening reaction of glycerophosphorylcholine to the amino groups of the polymer coating of the material can be carried out easily by stirring both of them in a solvent. This reaction is carried out by dissolving these two in water or alcohol (a third organic solvent ingredient can be mixed in, too) to form an imine and reducing it with a reducing agent to obtain a secondary amine. For the reducing agent, a mild reducing agent such as sodium cyanoboronate is preferable, but other reducing agents can be used as long as the phosphorylcholine is stable. The reaction is usually carried out at 0° C. to room temperature, but heating may be done depending on the situation.

Specifically, the material is soaked in methanol, to which phosphatidylglyceroaldehyde is added, and the mixture is left alone for six hours at room temperature. Sodium cyanoborate is then added at 0° C., followed by overnight heating and stirring, to add a phosphorylcholine group to an amino group. For the reaction solvent, protogenic solvents such as water, ethanol, and 2-propanol can be used in addition to methanol; the addition rate tends to be higher when methanol is used.

Using the aforementioned method, a material to whose surface a desired amount of hydrophilic phosphorylcholine groups is introduced is easily obtained. More specific methods are described below.

Modification Method 1-1

A copolymer having monomer 1 represented by the above formula (1-5) (hereafter abbreviated as "monomer 1") and monomer 2 represented by the above formula (1-6) (hereafter abbreviated as "monomer 2") as essential ingredients is synthesized. The selection of the reaction solvent is not limited in particular as long as it does not react with monomer 1 or 2 and does dissolve these two monomers. Examples include toluene, acetone, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis(isoacetate). In addition to the use of a polymerization initiator, polymerization can also be initiated by exposure to radiation, for example. The average molecular weight of the copolymer is not limited in particular since this is eventually for initiating a cross-linking reaction. In addition to the two types mentioned above, more monomers can be added for copolymerization depending on the affinity with the material.

<Modification Method 1-1-1>

A copolymer having monomer 1 and monomer 2 as essential ingredients is synthesized and spread on various substrates (material: metal, plastic, ceramics, glass, etc. of various shapes, for example). The remaining isocyanate and the phosphorylcholine group-containing chemical compound represented by the above formula (1-3) are condensed by means of urethane bonding to introduce the phosphorylcholine group (hereafter abbreviated as "PC group") represented by the above formula (1-1). The timing of initiating the cross-linking reaction of the polymer can be before or after the introduction of the PC group, depending on which is easier. A treatment with water would accelerate the cross-linking reaction; this reaction, however, would proceed gradually even when the film is left alone.

<Modification Method 1-1-2>

A copolymer having monomer 1 and monomer 2 as essential ingredients is synthesized and spread on various substrates (materials). This is then treated with water or a basic aqueous solution to break down the isocyanate and convert it to amine. This amino group and the phosphorylcholine group-containing chemical compound represented by the above formula (1-2) (hereafter abbreviated as "PC2") are bonded by means of a reductive amination reaction to introduce the PC group. Or, the aforementioned polymer can be treated with ethylenediamine to introduce the amino group and then bonded with the phosphorylcholine group-containing chemical compound represented by the above formula (1-2) by means of a reductive amination reaction.

Modification Method 1-2

A copolymer having monomer 1 and the monomer represented by the above formula (1-7) (hereafter abbreviated as "monomer 3") as essential ingredients is synthesized. The selection of the reaction solvent is not limited in particular as long as it does not react with monomer 1 or 3 and does dissolve these two monomers. Examples include toluene, acetone, methanol, ethanol, 2-propanol, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis(isoacetate). In addition to the use of a polymerization initiator, polymerization can also be initiated by exposure to radiation, for example. The average molecular weight of the copolymer is not limited in particular since this is eventually for initiating a cross-linking reaction. In addition to the two types mentioned above, more monomers can be added for copolymerization depending on the affinity with the substrate.

A copolymer having monomer 1 and monomer 3 as essential ingredients is synthesized and spread on the surface of various (substrate) materials. These are then treated with an aqueous solution of ammonia or a chemical compound that has two or more amino groups in its molecule, such as ethylenediamine, to convert the epoxy group to an amino group. PC2 is then bonded by means of a reductive amination reaction to introduce the PC group.

Modification Method 1-3

A copolymer having monomer 1 and the monomer represented by the above formula (1-8) (hereafter abbreviated as "monomer 4") or a monomer prepared by protecting monomer 4's amino group with a butoxycarbonyl or benzyloxycarbonyl as essential ingredients is synthesized. The selection of the reaction solvent is not limited in particular as long as it does not react with monomer 1 or 4 and does dissolve these two monomers. Examples include toluene, acetone, methanol, ethanol, 2-propanol, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis(isoacetate). In addition to the use of a polymerization initiator, polymerization can also be initiated by exposure to radiation, for example. The average molecular weight of the copolymer is not limited in particular since this is eventually for initiating a cross-linking reaction.

In addition to the two types mentioned above, more monomers can be added for copolymerization depending on the affinity with the material.

A copolymer having monomer 1 and monomer 4 as essential ingredients is synthesized and spread on the surface of various substrates (materials). PC2 is then bonded by means of a reductive amination reaction to introduce the PC group. When the amino group is protected, the deprotection treatment (a trifluoroacetic acid treatment for the butoxycarbonyl and a palladium catalyst treatment in a hydrogen atmosphere for the benzyloxycarbonyl) is carried out before introducing the PC group.

Modification Method 1-4

A copolymer having monomer 1 and (meth)acrylic acid as essential ingredients is synthesized. The selection of the reaction solvent is not limited in particular as long as it does not react with monomer 1 or (meth)acrylic acid and does dissolve these two monomers. Examples include toluene, acetone, methanol, ethanol, 2-propanol, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis(isoacetate). In addition to the use of a polymerization initiator, polymerization can also be initiated by exposure to radiation, for example. The average molecular weight of this copolymer is not limited in particular since this is eventually for initiating a cross-linking reaction. In addition to the two types mentioned above, more monomers can be added for copolymerization depending on the affinity with the material. A copolymer having monomer 1 and (meth)acrylic acid as essential ingredients is spread on various substrates (materials).

The PC group is bonded to these by using a carbodiimidazole coupling agent or carbodiimide-type coupling agent such as dicyclohexylcarbodiimide and 1-(3-dimethylaminopropyl)-3-ethylcarbodiimide.

Or, after turning the carboxyl group in the copolymer into an acid chloride by using thionyl chloride or converting it into an active ester such as N-hydroxysuccinimide, the PC group is bonded by means of a reaction with an alcohol having a PC group.

[2: Invention Defined by a Modified Powder]

The modified powder of the present invention is prepared by using the following method. "Having phosphorylcholine groups directly on the powder surface" means that phosphorylcholine groups are introduced to the powder surface by chemical bonding; powder to which phosphorylcholine groups are introduced by coating with a polymer having phosphorylcholine groups is not included in this definition.

The modified powder of the present invention is prepared by using the following steps. If the powder surface already has amino groups and there is no need to introduce additional amino groups, then step 1 is omitted.

Step 1: Amino groups are introduced to any powder by using a prior art method or a method that will be developed in the future. Amino groups are directly introduced to the powder surface. "Directly" means that methods in which a polymer having amino groups is used for coating are not included. The amino groups can be primary amines or secondary amines.

Step 2: An aldehyde derivative or hydrate derivative obtained by the oxidative ring-opening reaction of glycerophosphorylcholine is used in the reductive amination reaction to directly add phosphorylcholine groups to the surface of the powder having amino groups.

The selection of the powder to be used is not limited in particular. This generally means any object having an average particle size of about 0.01-10 micrometers. Specific examples include inorganic powders (for example, talc, kaolin, mica, sericite, muscovite, phlogopite, synthetic mica, lepidolite, biotite, vermiculite, magnesium carbonate, calcium carbonate, aluminum silicate, barium silicate, calcium silicate, magnesium silicate, strontium silicate, tungstic acid metal salt, magnesium, silica, zeolite, barium sulfate, firing calcium sulfate (calcined gypsum), calcium phosphate, fluorine-apatite, hydroxy apatite, ceramic powder, metallic soaps (for example, zinc myristate, calcium palmitate, and aluminum stearate), boron nitride, and cerium oxide); organic powders (for example, polyamide resin powder (nylon powder), polyethylene powder, poly methyl methacrylate powder, benzoguanamine resin powder, polytetrafluoroethylene powder, polymethylsilsesquioxane powder, silicone elastomer powder, and cellulose powder); inorganic white pigments (for example, titanium dioxide and zinc oxide); inorganic red pigments (for example, iron oxide (red iron oxide) and iron titanate); inorganic brown pigments (for example, γ-iron oxide); inorganic yellow pigments (for example, yellow iron oxide and loess); inorganic black pigments (for example, black iron oxide and low oxides of titanium); inorganic purple pigments (for example, manganese violet, cobalt violet); inorganic green pigments (for example, chromium oxide, chromium hydroxide, and cobalt titanate); inorganic blue pigments (for example, ultramarine blue and Berlin blue); pearl pigment (for example, titania coated mica, titania coated bismuth oxychloride, titania coated talc, coloration titania coated mica, bismuth oxychloride, fish scale flakes); metal powder pigments (for example, aluminum powder, copper powder); organic pigments such as Zr, barium or aluminum rake (for example, organic pigments such as red 201, red 202, red 204, red 205, red 220, red 226, red 228, red 405, orange 203, orange 204, yellow 205, yellow 401 and blue 404, as well as red 3, red 104, red 106, red 227, red 230, red 401, red 505, orange 205, yellow 4, yellow 5, yellow 202, yellow 203, green 3 and blue 1; and natural colors (for example, chlorophyll and β-carotene).

Examples of a prior art method for introducing amino groups to these powders (step 1) follow:

1. Introduction of Amino Groups by Means of a Surface Reaction via a Plasma Treatment Amino groups are introduced to the powder surface by means of a low temperature plasma in a nitrogen gas atmosphere. Specifically, the powder is put into a plasma reactor vessel and, after a vacuum pump is used to form a vacuum in the reactor vessel, nitrogen gas is introduced. Amino groups can be then introduced to the material surface by means of glow discharge. This method can be applied to materials other than powder. For example, it can be applied to materials such as fluorocarbon resin, various metals (stainless steel, titanium alloy, aluminum, iron, etc.), ceramics, carbon-type materials, various polymers (urethane, polycarbonate, polyimide, acrylic type, vinyl type, polysaccharides, polyalkylsiloxane, etc.), organic-inorganic complex type materials, and various inorganic materials (mica, talc, kaolin, alumina, titanium oxide, zinc oxide, iron oxide, various inorganic pigments, etc.). It is also possible to mechanically turn the plasma-treated material into powder. References related to the plasma treatment are shown below:

1. M. Muller, C. oehr Plasma aminofunctionalisation of PVDF microfiltration membranes: comparison of the in plasma modifications with a grafting method using ESCA and an amino-selective fluorescent probe Surface and Coatings Technology 116-119 (1999) 802-807
2. Lidija Tusek, Mirko Nitschke, Carsten Werner, Karin Stana-Kleinschek, Volker Ribitsch Surface characterization of NH3 plasma treated polyamide 6 foils Colloids and Surfaces A: Physicochem. Eng. Aspects 195 (2001) 81-95
3. Fabienne Poncin-Epaillard, Jean-Claude Brosse, Thierry Falher Reactivity of surface groups formed onto a plasma treated poly (propylene) film Macromol. Chem. Phys. 200. 989-996 (1999)

2. Introduction of Amino Groups by Means of a Surface Modifier

The surface of silanol-containing powder, titanium oxide powder and the like are treated with a surface modifier having amino groups, such as alkoxysilane, chlorosilane, and silazane.

For example, silica powder is treated with 3-aminopropyltrimethoxysilane, which has a primary amino group, to introduce amino groups. Specifically, silica is soaked in a mixed solution of water and 2-propanol, and, after adding 3-aminopropyltrimethoxysilane, the temperature is raised to 100° C. and the reaction is carried out for six hours. After cooling down to room temperature, the silica is rinsed with methanol and dried to obtain a powder that has amino groups directly introduced onto the silica surface. In addition to silica, examples of the powders preferably treated with this method include powder composed of glass, alumina, talc, clay, aluminum, iron, mica, asbestos, titanium oxide, zinc flower, and iron oxide.

3. Introduction of Amino Groups by Means of the Silicone Vapor Phase Treatment (Refer to Japanese Patent Publication No. H1-54379, Japanese Patent Publication No. H1-54380 bulletin, and Japanese Patent Publication No. H1-54381 bulletin.)

The powder surface is treated with 1.3.5.7-tetramethylcyclotetrasiloxane and then Si—H groups introduced onto the surface are reacted with monomers having an amino group to obtain an aminated surface. For example, mica and 1.3.5.7-tetramethylcyclotetrasiloxane are put into a desiccator and an aspirator is used to deaerate it. The reaction is carried out for 16 hours at 80° C., and the mica is taken out and dried at 120° C. The obtained mica is dispersed in ethanol, to which allylamine is added, and an ethanol solution of chloroplatinic acid is added, followed by two hours of stirring at 60° C. After the reaction is completed, filtration, ethanol rinsing, and reduced-pressure drying is carried out to obtain aminated mica. Examples of powders that can be preferably treated with this method include fluorocarbon resin, various metals (stainless steel, titanium alloy, aluminum, iron, etc.), ceramics, carbon-type materials, various polymers (urethane, polycarbonate, polyimide, acrylic type, vinyl type, polysaccharides, polyalkylsiloxane, etc.), organic-inorganic complex type materials, and various inorganic materials (mica, talc, kaolin, alumina, titanium oxide, zinc oxide, iron oxide, various inorganic pigments, etc.).

For the monomer to be used in this method, an amine-type monomer can be used. The amine-type monomer is not limited to allylamine as long as it has a reactive site such as polymerizable vinyl and acrylate, and an amino group. The amino group can be protected by a butoxycarbonyl group, benzyloxycarbonyl group or the like.

In addition to an amine-type monomer, a monomer having a functional group such as an epoxy group, to which an amino group can be easily introduced by means of, for example, a reaction with diamine, can be used as well.

Next, a method for introducing phosphorylcholine groups onto the aminated powder surface (step 2) is described below.

The powder is soaked in methanol, to which phosphatidylglyceroaldehyde is added, and the mixture is left alone for six hours at room temperature. Sodium cyanoborate is then added at 0° C., followed by overnight heating and stirring, to add a phosphorylcholine group to an amino group.

The powder is rinsed with methanol and dried to obtain powder that has phosphorylcholine groups directly on the surface. For the reaction solvent, protogenic solvents such as water, ethanol, and 2-propanol can be used in addition to methanol; the introduction rate tends to be higher when methanol is used.

A scheme of a method in which 3-aminopropyltrimethoxysilane is used as the surface modifier to introduce phosphoryicholine groups (hereafter abbreviated as "PC") is described below.

Step 1 [Aminopropylation of the silica surface (common technique)]

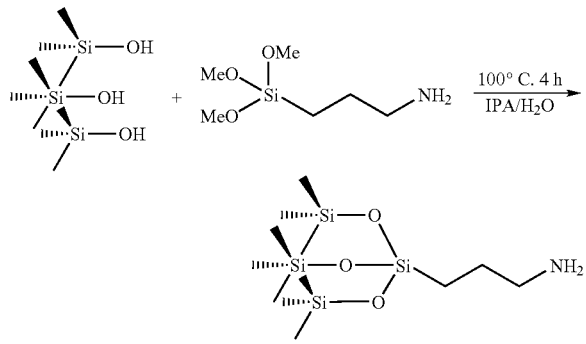

Step 2 [Introduction of PC]

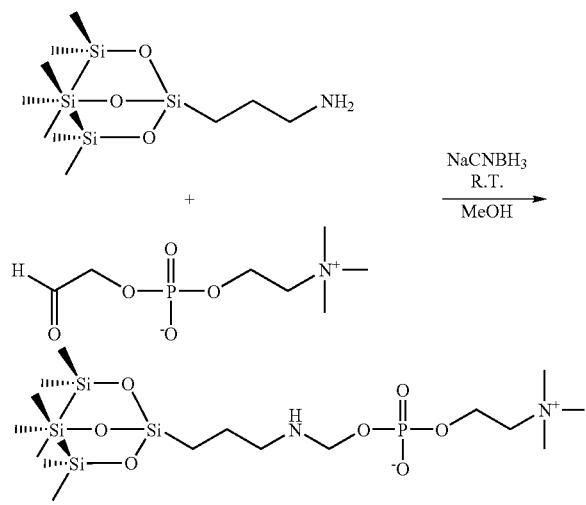

As described above, the modified powder of the present invention can be easily obtained by a method in which powder having amino groups is prepared and then a reductive amination reaction with a hydrate derivative or aldehyde derivative obtained by the oxidative ring-opening reaction of glycerophosphorylcholine is used to directly add phosphorylcholine groups to the powder surface. The preparation method of the present invention has the following great advantages: the introduction rate of the phosphorylcholine group is high, and the surface of various materials can be modified.

In the method of the present invention, the compound containing the aldehyde derivative obtained by the oxidative ring-opening reaction of glycerophosphorylcholine is obtained by oxidative ring-opening of a prior art glycerophosphorylcholine group by means of a prior art method, which is a very easy step. This reaction uses periodic acid or periodate to oxidize 1,2-diol to open the bond and obtain two aldehyde derivatives; in this particular method, a phosphorylcholine aldehyde derivative and formaldehyde are produced. The reaction is usually carried out in water or in an organic solvent containing water. The reaction temperature is between 0° C. to room temperature. The aldehyde derivative may go through an equilibrium reaction in water to become a hydrate, but this does not affect the subsequent reaction with the amine. A scheme for preparing a monofunctional aldehyde derivative containing a phosphorylcholine group is described below.

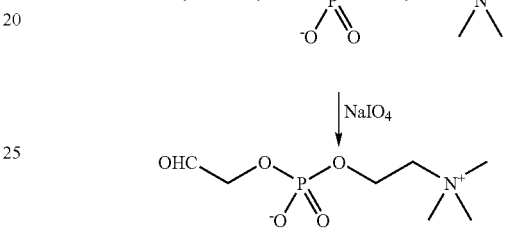

Selection of the powder having amino groups is not limited in particular. It is sufficient if there are amino groups with which the aldehyde derivative obtained by the oxidative ring-opening reaction of glycerophosphorylcholine can react on the powder surface, or in some cases on the inside surface of porous powder.

The reductive amination reaction for bonding the aldehyde derivative (or hydrate derivative) obtained by the oxidative ring-opening reaction of glycerophosphorylcholine to the amino groups of the powder can be carried out easily by stirring both of them in a solvent. This reaction is carried out by dissolving or dispersing these two in water or alcohol (a third organic solvent ingredient can be mixed in, too) to form an imine and reducing it with a reducing agent to obtain a secondary amine. For the reducing agent, a mild reducing agent such as sodium cyanoboronate is preferable, but other reducing agents can be used as long as the phosphorylcholine is stable. The reaction is usually carried out at 0° C. to room temperature, but heating may be done depending on the situation.

Using the aforementioned preparation method, powder containing a desired amount of hydrophilic phosphorylcholine groups is easily obtained. When the powder is a synthetic polymer, its hydrophilic portion may include a carboxylate group, hydroxyl group, primary-tertiary amine group, sulfonate group, phosphate group, polyoxyethylene group, ammonium group, amide, carboxybetaine, and saccharide, and the type and content of these in the powder can be adjusted to design its functions. As for the hydrophobic portion, depending on the application, straight chain or branched alkyls having 2-22 carbon atoms, cyclic alkyls such as cholesterol, alkyl groups containing unsaturated bonds such as oleyl, hydrocarbon type aromatics such as benzene rings, naphthalene rings, and pyrene, hetero type aromatics such as pyridine rings, imidazole, thiazole, and indole, and hydrophobic groups such as perfluoroalkyl and polyalkylsiloxane can be contained; the selection can be made based on the application of the powder. The hydrophobic group of the synthetic polymer powder can bond directly to the polymer main chain with the ester, ether, amide, urethane, or urea bond, or indirectly via a spacer. Examples of the spacer include hydrophilic polyethyleneoxide and hydrophobic polypropyleneoxide and straight chain alkyls having 2-22 carbon atoms.

Also, a modified powder that manifests new functions can be designed by modifying some of the amino groups on the powder surface with phosphorylcholine groups and the rest with other functional groups. The quantity of the amino groups introduced to the powder is determined by means of elemental analysis and the like, and then a desired quantity of the compound containing the aldehyde derivative obtained by the oxidative ring-opening reaction of glycerophosphorylcholine is used to prepare the modified powder]. After this, any functional groups can be added to the rest of the amino groups. This technique can be used generally for any powder.

The modified powder of the present invention is a powder having superior hydrophilicity and moisture retention. This can be used as biocompatible powder in a wide range of applications such as cosmetics, medical materials, chromatography packings, and paints.

[3: Invention Defined by a Chromatography Packing]

In the chromatography packing of the present invention, "Having phosphorylcholine groups bonded directly on the carrier surface" means that phosphorylcholine groups are introduced to the carrier surface by a chemical bonding; a carrier to which phosphorylcholine groups are introduced by coating with a polymer having phosphorylcholine groups is not included in this definition.

The chromatography packing of the present invention is prepared by using the following steps. If the carrier surface already has amino groups and there is no need to introduce additional amino groups, then step 1 is omitted.

Step 1: Amino groups are introduced to any carrier by using a prior art method or a method that will be developed in the future. Amino groups are directly introduced onto the carrier surface. "Directly" means that methods in which a polymer having amino groups is used for coating are not included. The amino group can be primary amine or secondary amine.

Step 2: An aldehyde derivative or hydrate derivative obtained by the oxidative ring-opening reaction of glycerophosphorylcholine is used in a reductive amination reaction to directly add phosphorylcholine groups to the surface of the carrier having amino groups.

Examples of the carrier used in the present invention include inorganic porous substances such as silica, silica gel, activated carbon, zeolite, alumina, and clay minerals, and porous organic polymer resins. The carrier is preferably in a powder form. Preferable is spherical or crushed porous silica gel. The average particle size of the spherical porous silica gel is 1-200 micrometers, preferably 1-10 micrometers, and the average size of the fine pores on the spherical porous silica gel is 10-500 angstroms, preferably 80-300 angstroms; the specific surface area is 50-800 m$^2$/g, preferably 100-600 m$^2$/g.

Examples of a prior art method for introducing amino groups to these carriers (step 1) follow:

1. Introduction of Amino Groups by Means of a Surface Reaction via a Plasma Treatment Amino groups are introduced to the carrier surface by means of a low temperature plasma in a nitrogen gas atmosphere. Specifically, the powder that is to be the carrier is put into a plasma reactor vessel and, after a vacuum pump is used to form a vacuum in the reactor vessel, nitrogen gas is introduced. Amino groups can be then introduced to the carrier surface by means of glow discharge. It is also possible to mechanically turn the plasma-treated carrier into powder. References related to the plasma treatment are shown below:

1. M. Muller, C. oehr Plasma aminofunctionalisation of PVDF microfiltration membranes: comparison of the in plasma modifications with a grafting method using ESCA and an amino-selective fluorescent probe Surface and Coatings Technology 116-119 (1999) 802-807

2. Lidija Tusek, Mirko Nitschke, Carsten Werner, Karin Stana-Kleinschek, Volker Ribitsch Surface characterization of NH3 plasma treated polyamide 6 foils Colloids and Surfaces A: Physicochem. Eng. Aspects 195 (2001) 81-95

3. Fabienne Poncin-Epaillard, Jean-Claude Brosse, Thierry Falher Reactivity of surface groups formed onto a plasma treated poly (propylene) film Macromol. Chem. Phys. 200. 989-996 (1999)

2. Introduction of Amino Groups by Means of a Surface Modifier

The surface of the carrier composed of silanol-containing powder, titanium oxide powder and the like is treated with a surface modifier having amino groups, such as alkoxysilane, chlorosilane, and silazane.

For example, silica gel powder is treated with 3-aminopropyltrimethoxysilane, which has a primary amino group, to introduce amino groups. Specifically, silica gel is soaked in a mixed solution of water and 2-propanol, and, after adding 3-aminopropyltrimethoxysilane, the temperature is raised to 100° C. and the reaction is carried out for six hours. After cooling down to room temperature, the silica gel is rinsed with methanol and dried to obtain a powder that has amino groups directly introduced onto the silica surface. In addition to silica gel, examples of the carriers preferably treated with this method include powder composed of glass, alumina, talc, clay, aluminum, iron, mica, asbestos, titanium oxide, zinc flower, and iron oxide.

Next, a method for introducing phosphorylcholine groups onto the aminated carrier surface (step 2) is described below.

The carrier is soaked in methanol, to which phosphatidylglyceroaldehyde is added, and the mixture is left alone for six hours at room temperature. Sodium cyanoborate is then added at 0° C., followed by overnight heating and stirring, to add a phosphorylcholine group to an amino group. The carrier is rinsed with methanol and dried to obtain a carrier that has phosphorylcholine groups directly on the surface. For the reaction solvent, protogenic solvents such as water, ethanol, and 2-propanol can be used in addition to methanol; the introduction rate tends to be higher when methanol is used.

A scheme of a method in which 3-aminopropyltrimethoxysilane is used as the surface modifier to introduce phosphorylcholine groups (hereafter abbreviated as "PC") is described below.

Step 1 [Aminopropylation of the silica surface (common technique)]

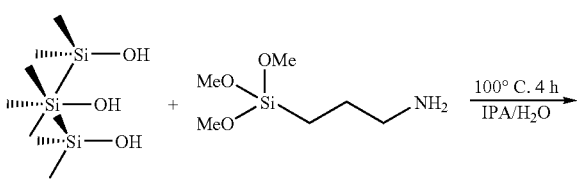

-continued

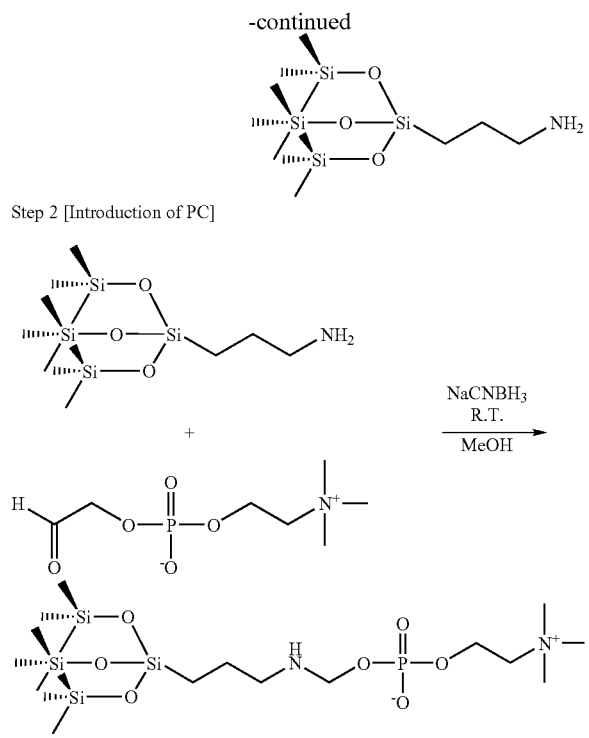

Step 2 [Introduction of PC]

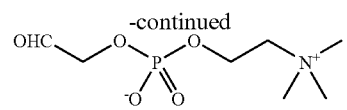

As described above, the chromatography packing of the present invention can be easily obtained by a method in which a carrier having amino groups is prepared and then a reductive amination reaction with a hydrate derivative or aldehyde derivative obtained by the oxidative ring-opening reaction of glycerophosphorylcholine is used to directly add phosphorylcholine groups to the carrier surface. The method for preparing the chromatography packing of the present invention has the following great advantages: the introduction rate of the phosphorylcholine group is high, and the surface of various carriers can be modified.

In the preparation method of the present invention, the chemical compound containing the aldehyde derivative obtained by the oxidative ring-opening reaction of glycerophosphorylcholine is obtained by oxidative ring-opening of the prior art glycerophosphorylcholine group by means of a prior art method, which is a very easy step. This reaction uses periodic acid or periodate to oxidize 1,2-diol to open the bond and obtain two aldehyde derivatives; in this particular method, a phosphorylcholine aldehyde derivative and formaldehyde are produced. The reaction is usually carried out in water or in an organic solvent containing water. The reaction temperature is between 0° C. to room temperature. The aldehyde derivative may go through an equilibrium reaction in water to become a hydrate, but this does not affect the subsequent reaction with the amine. A scheme for preparing a monofunctional aldehyde derivative containing a phosphorylcholine group is described below.

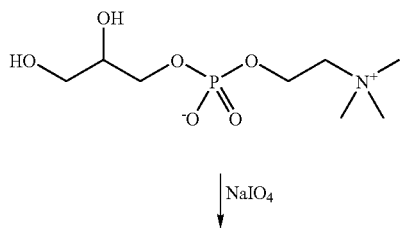

It is sufficient if there are amino groups with which the aldehyde derivative obtained by the oxidative ring-opening reaction of glycerophosphorylcholine can react on the carrier surface, or in some cases on the inside surface of a porous carrier. The carrier is preferably silica gel.

The reductive amination reaction for bonding the aldehyde derivative (or hydrate derivative) obtained by the oxidative ring-opening reaction of glycerophosphorylcholine to the amino groups of the carrier can be carried out easily by stirring both of them in a solvent. This reaction is carried out by dissolving or dispersing these two in water or alcohol (a third organic solvent ingredient can be mixed in, too) to form an imine and reducing it with a reducing agent to obtain a secondary amine. For the reducing agent, a mild reducing agent such as sodium cyanoboronate is preferable, but other reducing agents can be used as long as the phosphorylcholine is stable. The reaction is usually carried out at 0° C. to room temperature, but heating may be done depending on the situation.

Using the aforementioned preparation method, a carrier containing a desired amount of hydrophilic phosphorylcholine groups is easily obtained. When the carrier is a synthetic polymer, its hydrophilic portion may include a carboxylate group, hydroxyl group, primary-tertiary amine group, sulfonate group, phosphate group, polyoxyethylene group, ammonium group, amide, carboxybetaine, and saccharide, and the type and content of these in the material can be adjusted to design the packing's functions. As for the hydrophobic portion, depending on the application, straight chain or branched alkyls having 2-22 carbon atoms, cyclic alkyls such as cholesterol, alkyl groups containing unsaturated bonds such as oleyl, hydrocarbon type aromatics such as benzene rings, naphthalene rings, and pyrene, hetero type aromatics such as pyridine rings, imidazole, thiazole, and indole, and hydrophobic groups such as perfluoroalkyl and polyalkylsiloxane can be contained; the selection can be made based on the application of the powder. The hydrophobic group of the synthetic polymer powder can bond directly to the polymer main chain with the ester, ether, amide, urethane, or urea bond, or indirectly via a spacer. Examples of the spacer include hydrophilic polyethyleneoxide, hydrophobic polypropyleneoxide, and straight chain alkyls having 2-22 carbon atoms.

Also, a packing that manifests new functions can be designed by modifying some of the amino groups on the carrier surface with phosphorylcholine groups and the rest with other functional groups. The quantity of the amino groups introduced into the carrier is determined by means of elemental analysis and the like, and then a desired quantity of the compound containing the aldehyde derivative obtained by the oxidative ring-opening reaction of glycerophosphorylcholine is used. After this, any functional groups can be added to the rest of the amino groups.

The chromatography packing of the present invention is a column packing superior in suppressing adsorption of proteins and polypeptides. Therefore, it can be applied to a mode in which proteins and polypeptides are separated by the difference in the molecular weight (GFC mode).

Furthermore, it is a column packing having a higher separation ability based not only on a difference in the molecular weight of the samples but also on a subtle difference in the electric charge of the samples because of the dual electric charge of the phosphorylcholine group. There hasn't been a case of introducing a functional group having a dual electric charge for the purpose of suppressing adsorption of proteins and therefore it can be said that this is a completely new type of column packing for GFC. This characteristic of having electric charges not only allows a superior separation ability for proteins and polypeptides compared with separation based only on the difference in the molecular weight, but also allows an ability to control the interaction between the packing surface and proteins and/or polypeptides by changing the pH of the mobile phase. Therefore, there is the possibility to be able to hold target proteins and/or polypeptides at will by optimizing the pH of the mobile phase.

Since the GFC mode can separate and purify proteins and enzymes without deactivating them, a higher separation ability of the column packing of the present invention is expected to be useful in isolation of unknown biological samples and medical applications.

Specifically, the chromatography packing of the present invention is superior, for example, in separation of proteins in human serum and separation of polypeptides contained in samples obtained by means of tryptic digestion of proteins when used as a column packing with a high separation ability and very little protein and polypeptide adsorption.

[4: Invention Defined by a Liquid Contact Member]

In the present invention, a liquid-contacting member means a member that has contact with liquid. Examples include members that touch sample liquids, such as detector cells, sample vials, sampling needles, piping connectors, piping, etc. for separation or analytical apparatuses. For these liquid-contacting members, the surface of the parts that contact the sample liquid is coated with an alkoxysilyl group-containing polymer. For piping, piping connection parts, needles for sampling, sample vials, detector cells, etc., it is sufficient if the inner surface that contacts the sample liquid is coated. Specifically, connecting piping for HPLC, MS, and NMR and capillary piping for electrophoresis apparatuses are preferred embodiments.

The material and shape of the liquid-contacting member of the present invention is not limited. Examples include liquid-contacting members composed of various materials such as metal, plastic, glass, and ceramic.

Preferable embodiments of the present invention are pipings of separation and analytical apparatuses such as Teflon (registered trademark) tubes, Tefzel tubes, PEEK resin tubes, and fused silica tubes.

The selection of the alkoxysilyl group-containing polymer is not limited as long as the liquid-contacting member can be coated with it. A strong film is formed on the surface of the coated liquid-contacting member by means of the cross-linking reaction of alkoxysilane. For example, preferable is a (meth)acrylic-type monomer such as (meth)acrylic acid and (meth)acrylic alkyl ester that has alkoxysilyl group substitution; it can be a prior art monomer or a monomer to be developed in the future. Specifically, a polymer prepared by polymerizing the alkoxysilyl group-containing (meth)acrylamide-type monomer or (meth)acrylic-type monomer represented by the following general formula (4) is dissolved in a solvent to treat the surface of the liquid-contacting member and coating is carried out by means of cross-linking with a conventional method.

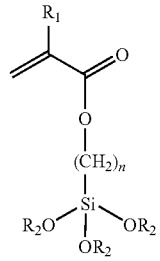

(4-4)

($R_1$ denotes a hydrogen atom or a straight chain or branched chain alkyl having 1-6 carbon atoms, $R_2$ denotes a straight chain or branched chain alkyl having 1-6 carbon atoms, and n is a number 1-6.)

In order to introduce the phosphorylcholine group represented by the following formula (1), the alkoxysilyl group-containing polymer to coat the liquid-contacting member must have some kind of reactive group that reacts with a phosphorylcholine group-containing chemical compound. A preferable reactive group is an amino group. The amino group can be a primary amine or secondary amine. The amino groups can be introduced by using a prior art method or a method to be developed in the future. The easiest and most preferable method is to use a copolymer that is copolymerized with an amine-type monomer having an amino group and/or a monomer that has an epoxy group and/or an isocyanate group that generates an amino group.

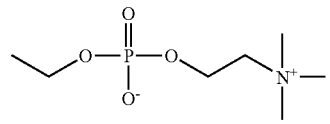

(4-1)

The copolymer with the amine-type monomer is not the only choice; a monomer having a functional group, such as an epoxy group or isocyanate group, to which an amino group can easily be introduced by means of a reaction with diamine and the like and an alkoxysilyl group-containing polymer can be copolymerized and the resulting polymer can be used.

A liquid-contacting member coated with an alkoxysilyl group-containing polymer using plasma polymerization can be immersed in a nitrogen-substituted THF (tetrahydrofuran) solution of allylamine to initiate graft polymerization to introduce amino groups.

Preferable monomers to be copolymerized are the monomers represented by the following formulas (4-5)-(4-7) and a (meth)acrylic monomer such as acrylic acid and methacrylic acid. The ester bonds (COO) in formulas (4-5)-(4-7) can also be an amide bond (CONH).

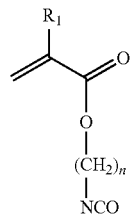

(4-5)

($R_1$ denotes a hydrogen atom or a straight chain or branched chain alkyl having 1-6 carbon atoms, and n is a number 1-6. —NH— can be used in place of —O—.)

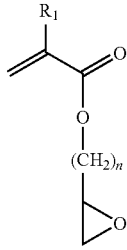
(4-6)

($R_1$ denotes a hydrogen atom or a straight chain or branched chain alkyl having 1-6 carbon atoms, and n is a number 1-6. —NH— can be used in place of —O—.)

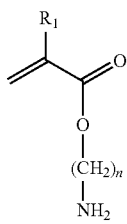
(4-7)

($R_1$ denotes a hydrogen atom or a straight chain or branched chain alkyl having 1-6 carbon atoms, and n is a number 1-6. —NH— can be used in place of —O—.)

For the monomer for copolymerization, in addition to the monomers having bonding functional groups as described above, other monomers can also be preferably used for copolymerization for the sake of the affinity between the liquid-contacting member and the alkoxysilyl group-containing polymer for the coating, depending on the properties of the liquid-contacting member. For example, when the material of the liquid-contacting member is polypropylene, butyl-methacrylate can be used to improve the affinity with the saturated carbon; similarly, polydimethylsiloxanemethacrylate for polysiloxane-type materials, and perfluoroalkyl monomers for Teflon (registered trademark) are used for copolymerization.

A phosphorylcholine group-containing chemical compound, preferably an aldehyde derivative or hydrate derivative obtained by the oxidative ring-opening reaction of glycerophosphorylcholine, is used in the reductive amination reaction to introduce phosphorylcholine groups to the amino groups introduced as described above. Preferable phosphorylcholine group-containing chemical compounds are the diol derivative represented by the following formula (4-2) and/or the aldehyde derivative represented by the following formula (4-3); bonding to the amino group is preferably carried out by means of a condensation reaction and/or reductive amination reaction.

As long as the final phosphorylcholine group-containing chemical compound is bonded to the amino group, any reaction path can be taken from the introduction of the amino group to the bonding.

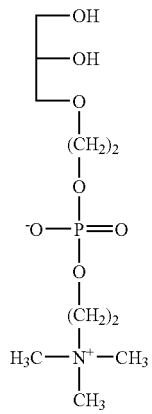
(4-2)

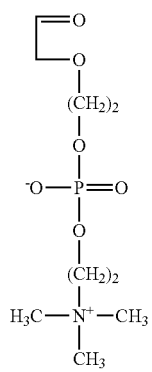
(4-3)

The aldehyde derivative obtained by the oxidative ring-opening reaction of glycerophosphorylcholine is obtained by oxidative ring-opening of the prior art glycerophosphorylcholine group by means of a prior art method, which is a very easy step. This reaction uses periodic acid or periodate to oxidize 1,2-diol to open the bond and obtain two aldehyde derivatives; in this particular method, a phosphorylcholine aldehyde derivative and formaldehyde are produced. The reaction is usually carried out in water or in an organic solvent containing water. The reaction temperature is between 0° C. to room temperature. The aldehyde derivative may go through an equilibrium reaction in water to become a hydrate, but this does not affect the subsequent reaction with the amine. A scheme for preparing a monofunctional aldehyde derivative containing a phosphorylcholine group is described below.

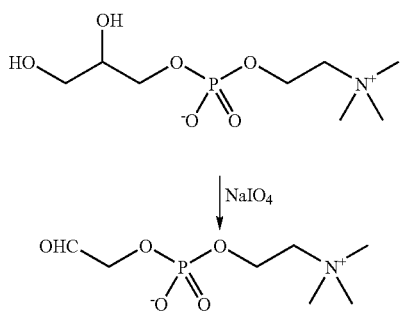

The reductive amination reaction for bonding the aldehyde derivative and/or hydrate derivative obtained by the oxidative ring-opening reaction of glycerophosphorylcholine to the amino groups of the polymer coating of the liquid-contacting member can be carried out easily by stirring both of them in a solvent. This reaction is carried out by dissolving these two in water or alcohol (a third organic solvent ingredient can be mixed in, too) to form an imine and reducing it with a reducing agent to obtain a secondary amine. For the reducing agent, a mild reducing agent such as sodium cyanoboronate is preferable, but other reducing agents can be used as long as the phosphorylcholine is stable. The reaction is usually carried out at 0° C. to room temperature, but heating may be done depending on the situation.

Specifically, the liquid-contacting member is soaked in methanol, to which phosphatidylglyceroaldehyde is added, and the mixture is left alone for six hours at room temperature. Sodium cyanoborate is then added at 0° C., followed by overnight heating and stirring, to add a phosphorylcholine group to an amino group. For the reaction solvent, protogenic solvents such as water, ethanol, and 2-propanol can be used in addition to methanol; the addition rate tends to be higher when methanol is used.

Using the aforementioned method, a liquid-contacting member to whose surface a desired amount of hydrophilic phosphorylcholine groups is introduced is easily obtained. More specific methods are described below.

Preparation Method 4-1

A copolymer having monomer 1 represented by the above formula (4-4) (hereafter abbreviated as "monomer 1") and the monomer represented by the above formula (4-5) (hereafter abbreviated as "monomer 2") as essential ingredients is synthesized. The selection of the reaction solvent is not limited in particular as long as it does not react with monomer 1 or 2 and does dissolve these two monomers. Examples include toluene, acetone, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis (isoacetate). In addition to the use of a polymerization initiator, polymerization can also be initiated by exposure to radiation, for example. The average molecular weight of the copolymer is not limited in particular since this is eventually for initiating a cross-linking reaction. In addition to the two types mentioned above, more monomers can be added for copolymerization depending on the affinity with the material.

<Preparation Method 4-1-1>

A copolymer having monomer 1 and monomer 2 as essential ingredients is synthesized and spread on a liquid-contacting member. The remaining isocyanate and the phosphorylcholine group-containing chemical compound represented by the above formula (4-2) (hereafter abbreviated as PC1) are used in the urethane bonding reaction to introduce the phosphorylcholine group (hereafter abbreviated as "PC group") represented by the above formula (4-1). The timing of initiating the cross-linking reaction of the polymer can be before or after the introduction of the PC group, depending on which is easier. A treatment with water would accelerate the cross-linking reaction; this reaction, however, would proceed gradually even when the film is left alone.

<Preparation Method 4-1-2>

A copolymer having monomer 1 and monomer 2 as essential ingredients is synthesized and spread on the surface of a liquid-contacting member. This is then treated with water or an basic aqueous solution to break down the isocyanate and convert it to amine. This amino group and the phosphorylcholine group-containing chemical compound represented by the above formula (4-2) (hereafter abbreviated as "PC2") are bonded by means of a reductive amination reaction to introduce the PC group.

Preparation Method 4-2

A copolymer having monomer 1 and the monomer represented by the above formula (4-6) (hereafter abbreviated as "monomer 3") as essential ingredients is synthesized. The selection of the reaction solvent is not limited in particular as long as it does not react with monomer 1 or 3 and does dissolve these two monomers. Examples include toluene, acetone, methanol, ethanol, 2-propanol, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis (isoacetate). In addition to the use of a polymerization initiator, polymerization can also be initiated by exposure to radiation, for example. The average molecular weight of the copolymer is not limited in particular since this is eventually for initiating a cross-linking reaction.

In addition to the two types mentioned above, more monomers can be added for copolymerization depending on the affinity with the substrate.

A copolymer having monomer 1 and monomer 3 as essential ingredients is synthesized and spread on the surface of a liquid-contacting member. This is then treated with an aqueous solution of ammonia or a chemical compound that has two or more amino groups in its molecule, such as ethylenediamine, to convert the epoxy group to an amino group. PC2 is then bonded by means of a reductive amination reaction to introduce the PC group.

Preparation Method 4-3

A copolymer having monomer 1 and the monomer represented by the above formula (4-7) (hereafter abbreviated as "monomer 4") as essential ingredients is synthesized. The selection of the reaction solvent is not limited in particular as long as it does not react with monomer 1 or 4 and does dissolve these two monomers. Examples include toluene, acetone, methanol, ethanol, 2-propanol, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis (isoacetate). In addition to the use of a polymerization initiator, polymerization can also be initiated by exposure to radiation, for example. The average molecular weight of the copolymer is not limited in particular since this is eventually for initiating a cross-linking reaction.

In addition to the two types mentioned above, more monomers can be added for copolymerization depending on the affinity with the material of the liquid-contacting member.

A copolymer having monomer 1 and monomer 4 as essential ingredients is synthesized and spread on a liquid-contacting member. PC2 is then bonded by means of a reductive amination reaction to introduce the PC group.

Preparation Method 4-4

A copolymer having monomer 1 and (meth)acrylic acid as essential ingredients is synthesized. The selection of the reaction solvent is not limited in particular as long as it does not react with monomer 1 or (meth)acrylic acid and does dissolve these two monomers. Examples include toluene, acetone, methanol, ethanol, 2-propanol, ethyl acetate, hexane, ether, tetrahydrofuran, dioxane, dimethylformamide, dimethylsulfoxide, dichloromethane, and chloroform; they can be used independently or as a mixed solvent of two or more of them. The selection of the polymerization initiator is not limited in particular as long as it is a radical-type initiator. Examples include peroxides such as benzoyl peroxide and azo-type chemical compounds such as azobisisobutyronitrile and dimethyl 2,2'-azobis (isoacetate). In addition to the use of a polymerization initiator, polymerization can also be initiated by exposure to radiation, for example. The average molecular weight of this copolymer is not limited in particular since this is eventually for initiating a cross-linking reaction. In addition to the two types mentioned above, more monomers can be added for copolymerization depending on the affinity with the material of the liquid-contacting member. A copolymer having monomer 1 and monomer 4 or 5 as essential ingredients is synthesized and spread on a liquid-contacting member. The PC group is introduced to this by using carbodiimidazole or a carbodiimide-type coupling agent such as dicyclohexylcarbodiimide and 1-(3-dimethylaminopropyl)-3-ethylcarbodiimide to bond PC 1.

[5: Invention Defined by a Filter]

In the filter material of the present invention, "Having phosphorylcholine groups bonded directly on the filter carrier surface" means that phosphorylcholine groups are introduced to the filter carrier surface by a chemical bonding; a filter carrier to which phosphorylcholine groups are introduced by coating with a polymer having phosphorylcholine groups is not included in this definition.

The filter material of the present invention is prepared by using the following steps. If the filter carrier surface already has amino groups and there is no need to introduce additional amino groups, then step 1 is omitted.

Step 1: Amino groups are introduced to any carrier by using a prior art method or a method that will be developed in the future. Amino groups are directly introduced onto the filter carrier surface. "Directly" means that methods in which a polymer having amino groups is used for coating are not included. The amino group can be a primary amine or a secondary amine.

Step 2: An aldehyde derivative or hydrate derivative obtained by the oxidative ring-opening reaction of glycerophosphorylcholine is used in a reductive amination reaction to directly add phosphorylcholine groups to the surface of the filter carrier having amino groups.

Examples of the carrier used in the present invention include inorganic porous substances such as silica, zeolite, borosilicate glass, alumina, and clay minerals, and porous organic polymer resins.

Examples of a prior art method for introducing amino groups to these carriers (step 1) follow:

1. Introduction of Amino Groups by Means of a Surface Reaction via a Plasma Treatment Amino groups are introduced onto the carrier surface by means of a low temperature plasma in a nitrogen gas atmosphere. Specifically, the powder that is to be the carrier is put into a plasma reactor vessel and, after a vacuum pump is used to form a vacuum in the reactor vessel, nitrogen gas is introduced. Amino groups can be then introduced onto the carrier surface by means of glow discharge. It is also possible to mechanically turn the plasma-treated carrier into powder. References related to the plasma treatment are shown below:

1. M. Muller, C. oehr Plasma aminofunctionalisation of PVDF microfiltration membranes: comparison of the in plasma modifications with a grafting method using ESCA and an amino-selective fluorescent probe Surface and Coatings Technology 116-119 (1999) 802-807
2. Lidija Tusek, Mirko Nitschke, Carsten Werner, Karin Stana-Kleinschek, Volker Ribitsch Surface characterization of NH3 plasma treated polyamide 6 foils Colloids and Surfaces A: Physicochem. Eng. Aspects 195 (2001) 81-95
3. Fabienne Poncin-Epaillard, Jean-Claude Brosse, Thierry Falher Reactivity of surface groups formed onto a plasma treated poly (propylene) film Macromol. Chem. Phys. 200. 989-996 (1999)

2. Introduction of Amino Groups by Means of a Surface Modifier

The surface of the hydroxyl group-containing carrier is treated with a surface modifier having amino groups, such as alkoxysilane, chlorosilane, and silazane.

For example, borosilicate glass fiber filter paper is treated with 3-aminopropyltrimethoxysilane, which has a primary amino group, to introduce amino groups. Specifically, the borosilicate glass fiber filter paper is soaked in a mixed solution of water and 2-propanol, and, after adding 3-aminopropyltrimethoxysilane, the temperature is raised to 100° C. and the reaction is carried out for six hours. After cooling down to room temperature, the borosilicate glass fiber filter paper is rinsed with methanol and dried to obtain a filter material that has amino groups directly introduced onto the silica surface. Examples of carriers preferably treated with this method include, in addition to borosilicate glass, inorganic porous substances such as silica, zeolite, alumina, and clay minerals, and porous organic polymer resins.

Next, a method for introducing phosphorylcholine groups onto the aminated carrier surface (step 2) is described below.

The filter carrier is soaked in methanol, to which phosphatidylglyceroaldehyde is added, and the mixture is left alone for six hours at room temperature. Sodium cyanoborate is then added at 0° C., followed by overnight heating and stirring, to add a phosphorylcholine group to an amino group. The filter carrier is rinsed with methanol and dried to obtain a filter carrier that has phosphorylcholine groups directly on the surface. For the reaction solvent, protogenic solvents such as water, ethanol, and 2-propanol can be used in addition to methanol; the introduction rate tends to be higher when methanol is used.

A scheme of a method in which 3-aminopropyltrimethoxysilane is used as the surface modifier to introduce phosphorylcholine groups (hereafter abbreviated as "PC") is described below using silica as an example.

Step 1 <Aminopropylation of the silica surface (common technique)>

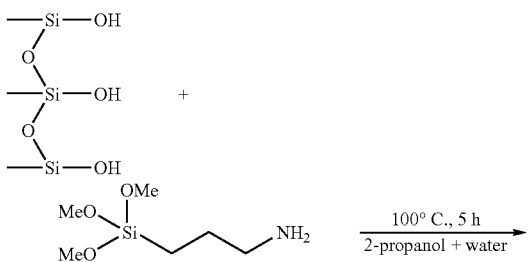

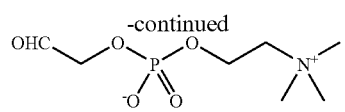

Step 2 <Introduction of phosphorylcholine groups>

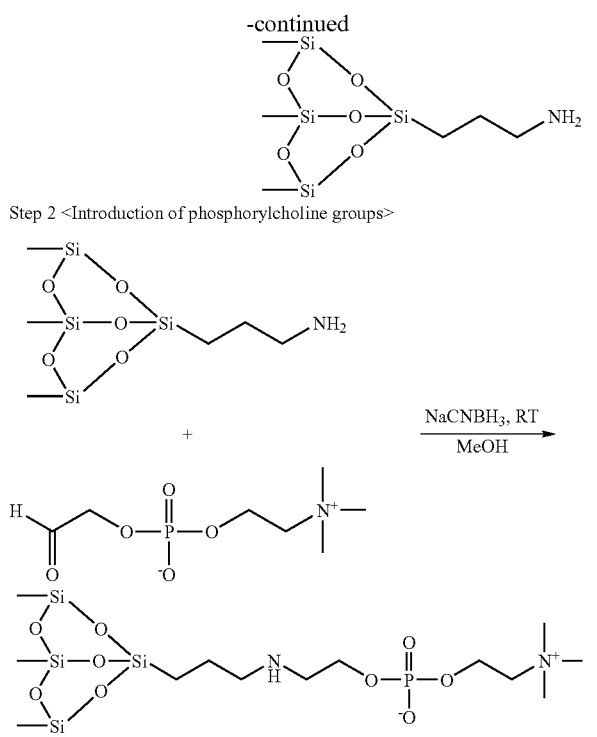

As described above, the filter carrier of the present invention can be easily obtained by a method in which a filter carrier having amino groups is prepared and then a reductive amination reaction with a hydrate derivative or aldehyde derivative obtained by the oxidative ring-opening reaction of glycerophosphorylcholine is used to directly add phosphorylcholine groups to the filter carrier surface; this method has a great advantage in that the surface of various filter carriers can be modified this way.

In the preparation method of the present invention, the chemical compound containing the aldehyde derivative obtained by the oxidative ring-opening reaction of glycerophosphorylcholine is obtained by oxidative ring-opening of the prior art glycerophosphorylcholine group by means of a prior art method, which is a very easy step. This reaction uses periodic acid or periodate to oxidize 1,2-diol to open the bond and obtain two aldehyde derivatives; in this particular method, a phosphorylcholine aldehyde derivative and formaldehyde are produced. The reaction is usually carried out in water or in an organic solvent containing water. The reaction temperature is between 0° C. to room temperature. The aldehyde derivative may go through an equilibrium reaction in water to become a hydrate, but this does not affect the subsequent reaction with the amine. A scheme for preparing a monofunctional aldehyde derivative containing a phosphorylcholine group is described below.

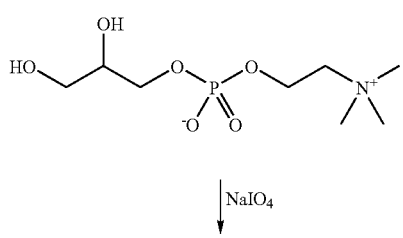

It is sufficient if there are amino groups with which the aldehyde derivative obtained by the oxidative ring-opening reaction of glycerophosphorylcholine can react on the filter carrier surface, or in some cases on the inside surface of a porous filter carrier.

The reductive amination reaction for bonding the aldehyde derivative (or hydrate derivative) obtained by the oxidative ring-opening reaction of glycerophosphorylcholine to the amino groups of the filter carrier can be carried out easily by stirring both of them in a solvent. This reaction is carried out by dissolving or dispersing these two in water or alcohol (a third organic solvent ingredient can be mixed in, too) to form an imine and reducing it with a reducing agent to obtain a secondary amine. For the reducing agent, a mild reducing agent such as sodium cyanoboronate is preferable, but other reducing agents can be used as long as the phosphorylcholine is stable. The reaction is usually carried out at 0° C. to room temperature, but heating may be done depending on the situation.

Using the aforementioned preparation method, a filter carrier containing a desired amount of hydrophilic phosphorylcholine groups is easily obtained.

The filter material of the present invention can be used specifically as a filter material with. very little adsorption of proteins and polypeptides that is superior in the separation of human blood cells and plasma, or in the fractionation of a mixed solution of proteins having different molecular weights.

Furthermore, by using the filter material of the present invention prepared by using anode oxidation porous alumina obtained by the anode oxidation of aluminum in an acidic electrolyte solution and that has homogeneous fine pores vertical to the filter plane, or prepared by using this anode oxidation porous alumina base substrate as a transfer template, a filter material capable of accurate fractionation of proteins having different molecular weights can be provided by taking advantage of the highly homogeneous pore size of this filter material.

EXAMPLES

The present invention is described in detail below by referring to Examples. The present invention is not limited to the following Examples. The introduced phosphorylcholine groups can be verified and quantified by the FT-IR and element analysis.

Synthesis Example 1

An Aldehyde Derivative Containing a Phosphorylcholine Group

L-α-glycerophosphorylcholine (450 mg) is dissolved in 15 ml of distilled water and cooled in an ice water bath. Sodium periodate (750 mg) is added and two hours of stirring is carried out. Furthermore, ethylene glycol (150 mg) is added and overnight stirring is carried out. The reaction solution is vacuum-concentrated and vacuum-dried and the target substance is extracted with methanol.

The structural formula and the NMR spectrum are shown in FIG. 1.

[1: Invention Defined by Surface Modification]

Example 1-1

Figure 2:
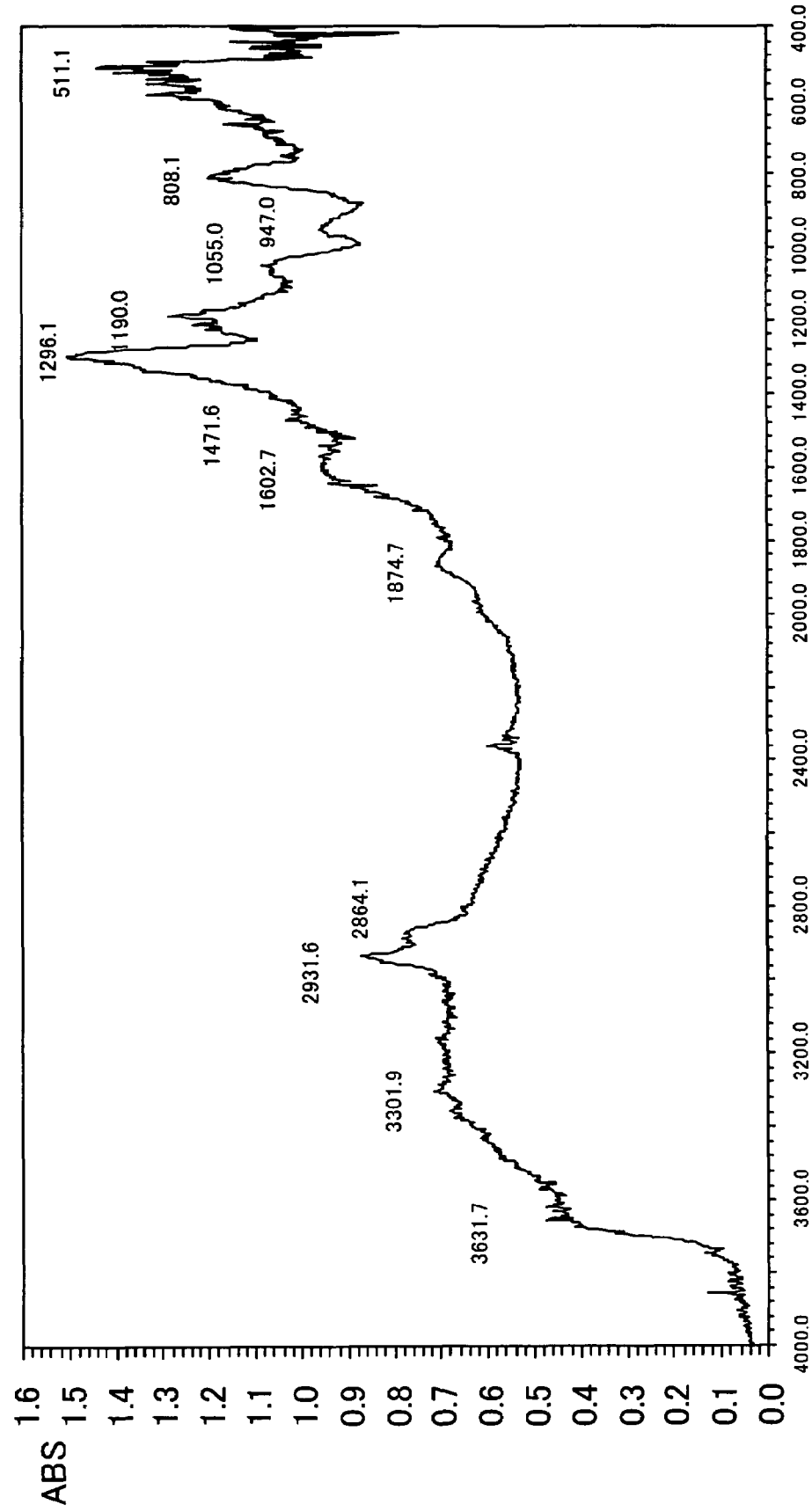
FIG. 2 is a FT-IR spectrum of the silica gel to which the amino group is introduced, as described in Example 1-1.

Silica Gel Modified with Phosphorylcholine Groups 10 g of silica gel having an average size of 5 micrometers (pore size 80 angstroms) is dispersed in water (15 ml)/2-propanol (15 ml), to which 3-aminopropylmethoxysilane (5 g) is added, and the temperature is raised to 100° C. and the reaction is carried out for 6 hours. After cooling down to room temperature, the silica gel is filtered, rinsed, and dried under a reduced pressure to obtain silica to which amino groups have been introduced. A transmission type FT-IR spectrum of this silica is shown in FIG. 2.

This silica gel is dispersed in 100 ml of methanol and mixed with 10 g of the compound obtained in Synthetic example 1, followed by stirring for 6 hours at room temperature. This mixed solution is then cooled in an ice bath, 3 g of sodium cyanotrihydroborate is added to it, and stirring is carried out overnight at room temperature; the silica gel is then filtered, rinsed with methanol, and dried under a reduced pressure to obtain 10.6 g of silica gel having the target phosphorylcholine groups directly on the surface. A FT-IR spectrum of this silica gel is shown in FIG. 3.

Figure 3:
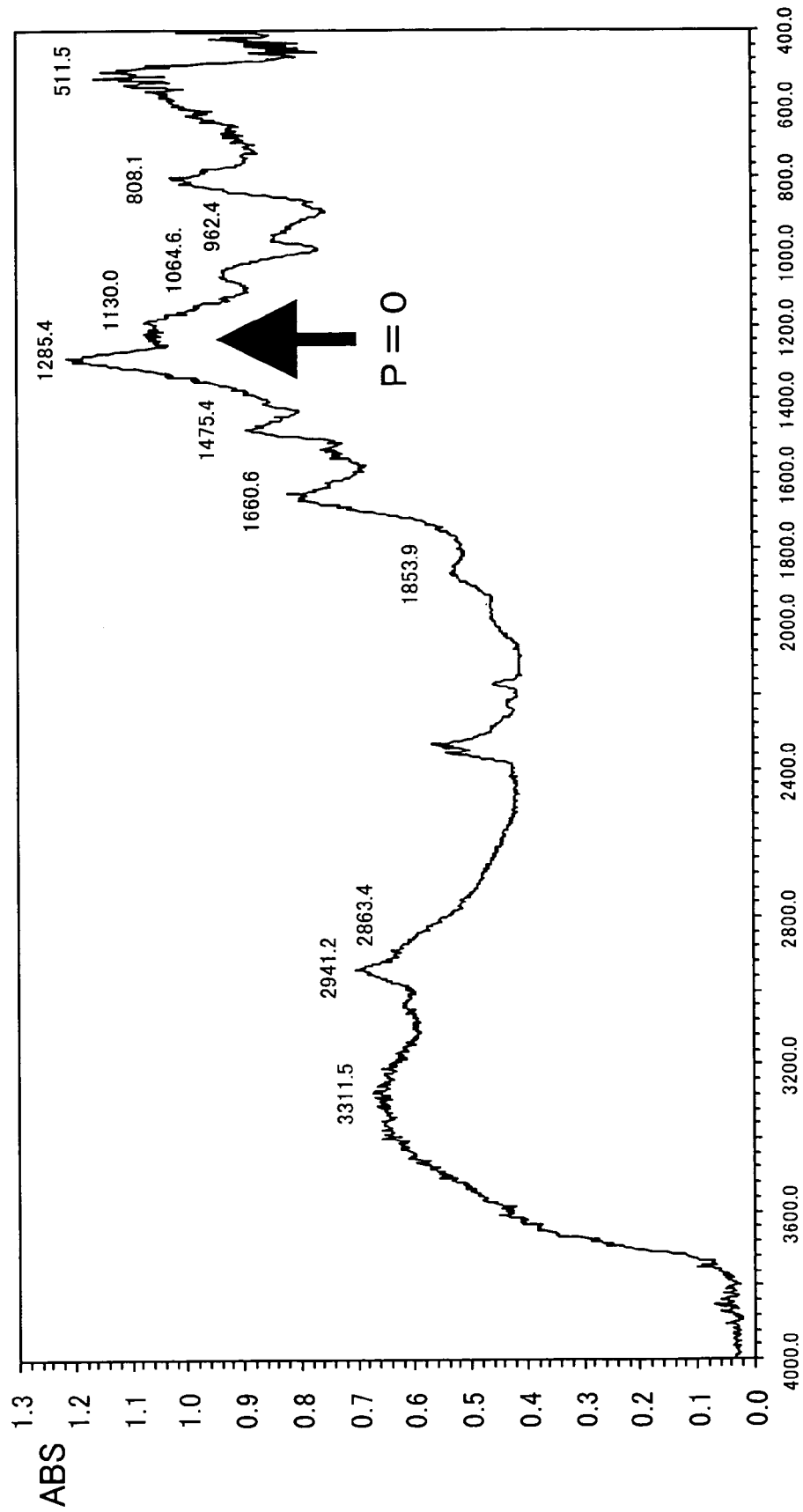
FIG. 3 is a FT-IR spectrum of the modified silica gel of Example 1-1.

FIG. 3 shows that a peak due to phosphate groups appears around 1,250 cm$^{-1}$, which indicates that the phosphorylcholine group is introduced onto the powder surface.

The element analysis values of the powder are shown, too.

TABLE 1-1

|  | C | H | N |
|---|---|---|---|
| 3-aminopropyltrimethoxysilane | 7.27 | 2.05 | 2.49 |
| Modified powder of Example 1: Measured values | 10.76 | 2.05 | 3.80 |
| Calculated values | 11.30 | — | 3.56 |

The element analysis values shown above indicate that the phosphorylcholine group has been nearly quantitatively introduced to the modified powder of Example 1-1.

The silica powder modified with the method of the present invention has a superior effect in that the phosphorylcholine group is stable on the powder surface even after being held in a polar solvent such as acetone for a long time. In contrast, silica coated with a homopolymer and copolymer of 2-methacryloyloxyethyl phosphorylcholine cannot stably keep the phosphorylcholine group bonded to the powder due to elution of the coated polymer off of the powder surface. Also, since the silica surface is coated with the polymer, the original characteristics of the silica surface are altered by the characteristics of the polymer itself.

Example 1-2

N-isopropylacrylamide/Acrylic Acid Copolymer Particles Modified with Phosphorylcholine Groups Sodium dodecylsulfate (20 mg), N-isopropylacrylamide (2.7 g), acrylic acid (172 mg), and methylenebisacrylamide (121 mg) are dissolved in 200 ml of water, and, after a 30 minute stirring at 70° C. in a nitrogen atmosphere, a polymerization initiator (potassium persulfate 9.2 mg) is added, followed by 4 hours of stirring. The obtained particles (precursor of Example 1-2) are purified in water by means of dialysis, and then lyophilized. These particles are then dispersed in tetrahydrofuran (30 ml)/dimethylformamide (10 ml), and a tetrahydrofuran (10 ml)/dimethylformamide (50 ml) solution of dicyclohexylcarbodiimide (800 mg), hydroxybenzotriazole (500 mg), and 2,2'-(ethylenedioxy)bis(ethylamine) (1.14 g) is added at room temperature, followed by an overnight stirring. The particles are then dialyzed and lyophilized. Next, they are dispersed in methanol (70 ml), to which 1 g of the chemical compound of Synthetic example 1 is added, followed by a 6 hour stirring at room temperature; this mixture is cooled in an ice bath, 2.8 g of sodium cyanotrihydroborate is added, followed by an overnight stirring at room temperature. The obtained particles are dialyzed in water to obtain the target N-isopropylacrylamide/acrylic acid copolymer particles (620 mg) having phosphorylcholine groups directly on the particle surface.

Example 1-3

N-isopropylacrylamide/Acrylic Acid Copolymer Modified with Phosphorylcholine Groups Sodium dodecylsulfate (20 mg), N-isopropylacrylamide (2.4 g), acrylic acid (382 mg), and methylenebisacrylamide (121 mg) are dissolved in 200 ml of water, and, after a 30 minute stirring at 70° C. in a nitrogen atmosphere, a polymerization initiator (potassium persulfate 9.2 mg) is added, followed by 4 hours of stirring. The obtained particles (precursor of Example 1-3) are purified in water by means of dialysis, and then lyophilized. These particles (700 mg) are then dispersed in tetrahydrofuran (30 ml)/dimethylformamide (10 ml), and a tetrahydrofuran (10 ml)/dimethylformamide (50 ml) solution of dicyclohexylcarbodiimide (800 mg), hydroxybenzotriazole (500 mg), and 2,2'-(ethylenedioxy)bis(ethylamine) (1.14 g) is added at room temperature, followed by an overnight stirring. The particles are then dialyzed and lyophilized. Next, they are dispersed in methanol (70 ml), to which 1.2 g of the chemical compound of Synthetic example 1 is added, followed by a 6 hour stirring at room temperature; this mixture is cooled in an ice bath, 3 g of sodium cyanotrihydroborate is added, followed by an overnight stirring at room temperature. The obtained particles are dialyzed in water to obtain the target N-isopropylacrylamide/acrylic acid copolymer particles (650 mg) modified with phosphorylcholine groups.

Figure 4:
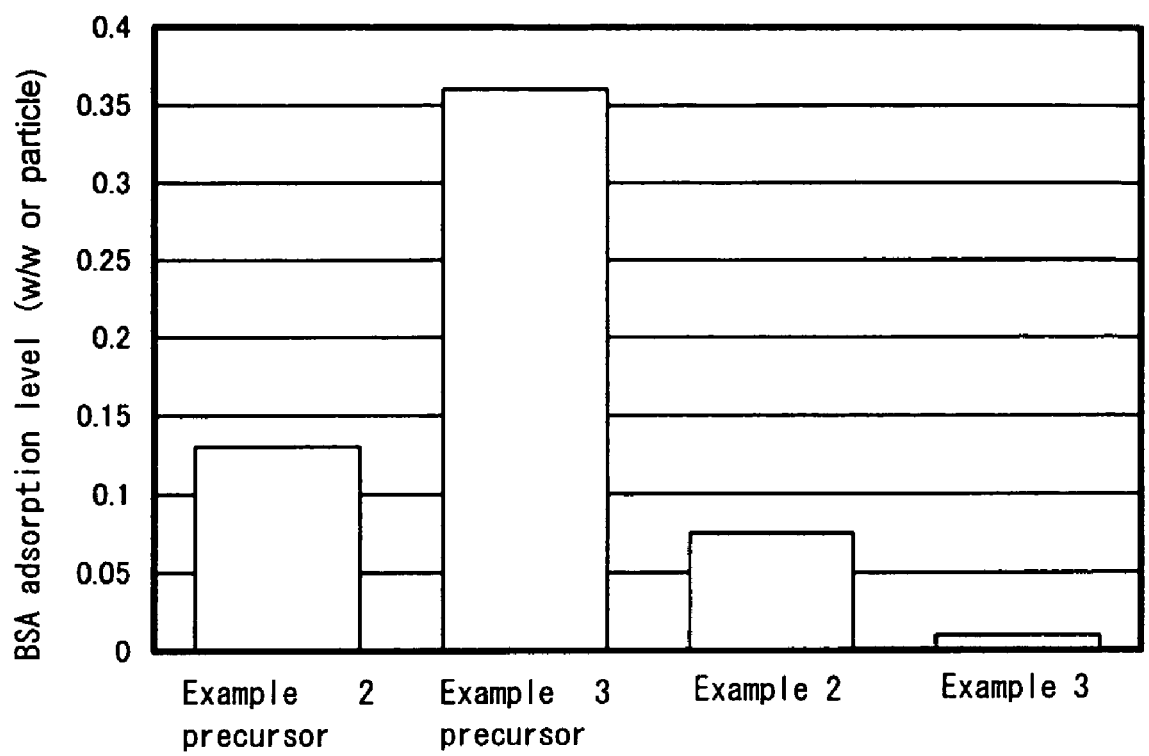
FIG. 4 is a graph showing the BSA adsorption level.

2 mg of particles obtained in Example 1-2 and Example 1-3 respectively is dispersed in 2 ml of a 5 mmol bovine serum albumin solution in a 2-(N-morpholino) ethane sulfonic acid buffer (pH 5), and, after being left alone overnight, the particles are removed by means of centrifugation, and the BSA concentration of the supernatant was quantified by using the UV absorption ($\lambda$=280 nm). The result is shown in FIG. 4.

The precursor of Example 1-2 and the precursor of Example 1-3, which do not have phosphorylcholine groups, adsorb a large amount of BSA, and Example 1-2 and Example 1-3, to which phosphorylcholine has been added, exhibit a reduction in the adsorption level. Also, Example 1-3, which has a higher introduction rate of the phosphorylcholine group, inhibits the adsorption of the BSA more effectively. Therefore, the modification method of the present invention effectively changes the characteristics of the material.

Example 1-4

Iron Plates Modified with Phosphorylcholine Groups

Iron plates (1 cm×1 cm, 1 mm thickness) are dispersed in water (20 ml)/2-propanol (20 ml), to which 3-aminopropylmethoxysilane (5 g) is added, the temperature is raised to 100° C. and the reaction is carried out for 6 hours. The iron plates are thoroughly rinsed with water and immersed in a methanol solution (50 ml) of an aldehyde derivative of phosphorylcholine (300 mg); after being left alone for 5 hours 100 mg of sodium cyanohydroborate is added to this at 0° C. after being left alone overnight at room temperature, the plates are rinsed with methanol to obtain the target iron plates modified with phosphorylcholine groups.

The protein adsorption levels of the iron plates of Example 1-4 and unmodified iron plates are compared. The two types of iron plates described above are immersed in 10 ml of a phosphate buffer solution of serum albumin (0.2%) and left alone for two weeks. The protein adsorption levels can be compared, after a light rinsing using a phosphate buffer, by observing the surface of the iron plates with an atomic force microscope. Proteins do not adhere to the iron plates modified with phosphorylcholine groups, whereas the unmodified iron plates show protein adhesion.

Example 1-5

A Fabric Modified with Phosphorylcholine Groups

A cotton fabric (3 cm×3 cm) is put into a plasma reaction vessel, into which nitrogen gas is introduced in a vacuum. After introducing amino groups to the surface by means of glow discharge, the fabric is immersed in methanol (20 ml), to which an aldehyde derivative of phosphorylcholine (300 mg) is added; after letting it alone for 6 hours, 100 mg of sodium cyanohydroborate is added to it at 0° C., followed by letting it alone overnight at room temperature. The obtained cotton fabric is thoroughly rinsed with water and dried to obtain the target fabric modified with phosphorylcholine groups. This fabric, compared with the fabric before the modification, is much improved in terms of the slimy sensation to the touch.

Example 1-6

Graphite Modified with Phosphorylcholine Groups

A piece of graphite (2 cm×2 cm, 1 mm thick) is put into a plasma reaction vessel, into which nitrogen gas is introduced in a vacuum. After introducing amino groups onto the surface by means of glow discharge, the graphite is immersed in methanol (20 ml), to which an aldehyde derivative of phosphorylcholine (300 mg) is added; after letting it alone for 6 hours at room temprature, 100 mg of sodium cyanohydroborate is added to it at 0° C., followed by letting it alone overnight at room temperature. The obtained graphite is thoroughly rinsed with water and dried to obtain the graphite modified with phosphorylcholine groups.

The protein adsorption levels of the graphite of Example 1-6 and unmodified graphite are compared. The two types of graphite described above are immersed in 10 ml of a phosphate buffer solution of serum albumin (0.2%) and left alone for two weeks. The protein adsorption levels can be compared, after lightly rinsing the graphite with a phosphate buffer, by observing the surface with an atomic force microscope. Proteins do not adhere to the graphite modified with phosphorylcholine groups, whereas the unmodified graphite shows protein adhesion.

The results of the aforementioned Examples indicate that a material modified with the method of the present invention is very useful in medical applications such as bioimplants where biocompatibility is required.

Described next are Examples of a method for surface modification of a material by means of introducing the phosphorylcholine group represented by formula (1-2) to the surface of the material by coating the surface of the material with a polymer containing alkoxysilyl groups, followed by bonding of the phosphorylcholine-containing compound represented by formulas (1-3) and/or (1-4) through a reductive amination reaction or condensation reaction.

Example 1-7

Commercially available monomer 1 (5 g), monomer 2 (n=2) (5 g), and butylmethacrylate (5 g) are dissolved in tetrahydrofuran (100 ml), followed by deaeration for 30 minutes in a nitrogen atmosphere. The temperature is raised up to 70° C. and azobisisobutyronitrile (5 mg) is added, followed by 4 hours of polymerization. The reaction solution is spread on a polyethylene plate. (2 cm×2 cm, 1 mm thick) and thoroughly dried. A dimethylformamide solution (100 ml) containing PC1 (1 g) and triethylamine (1 g) is prepared and the polyethylene plate is immersed in this solution for 5 hours at room temperature. The polyethylene plate is then rinsed with methanol and acetone to obtain the target polyethylene material modified with the PC group. Drying can be repeated after the water treatment to promote the cross-linking reaction on the polyethylene plate.

Example 1-8

The polymer of Example 1-7 is spread on a polypropylene plate (2 cm×2 cm, 1 mm thick) in the same manner and dried; the plate is then immersed in an aqueous solution containing triethylamine for 1 hour to advance the cross-linking reaction and also to convert isocyanate to amine. This polypropylene plate is then immersed in methanol, to which PC2 (1 g) is added; after being left alone for 5 hours at room temperature, sodium cyanoborate (0.5 g) is added in an ice bath and the plate is left alone for 12 hours at room temperature. This substrate is rinsed with methanol to obtain the target polypropylene material modified with the PC group.

Example 1-9

Commercially available monomer 1 (5 g), monomer 3 (n=1) (15 g), hydroxyethyl methacrylate (5 g), and trimethyl ammonium ethyl acrylate (1 g) are dissolved in ethanol (200 ml), followed by deaeration for 30 minutes in a nitrogen atmosphere. The temperature is raised up to 70° C. and azobisisobutyronitrile (5 mg) is added, followed by 4 hours of polymerization. The reaction solution is spread on a titanium plate (2 cm×2 cm, 1 mm thick) and thoroughly dried. For the purpose of cross-linking and converting epoxy groups to amino groups, this substrate is treated in aqueous ammonia for 5 hours at 50° C. This is then rinsed with methanol and immersed in methanol, to which PC2 (1 g) is added; after being left alone for 5 hours at room temperature, sodium cyanoborate (0.5 g) is added in an ice bath and the substrate is left alone for 12 hours at room temperature. This substrate is rinsed with methanol to obtain the target titanium plate modified with the PC group.

Example 1-10

Commercially available monomer 1 (5 g), monomer 4 (n=2) (2 g), methyl methacrylate (10 g), and dimethylpolysiloxane methacrylate (3 g) are dissolved in ethanol (100 ml)/hexane (50 ml), followed by deaeration for 30 minutes in a nitrogen atmosphere. The temperature is raised up to 70° C. and azobisisobutyronitrile (5 mg) is added, followed by 4 hours of polymerization. The reaction solution is spread on a silicone plate (2 cm×2 cm, 1 mm thick) and thoroughly dried. This silicone plate is then treated in water for 1 hour at room temperature for cross-linking. This is then dried and immersed in methanol, to which PC2 (1 g) is added; after being left alone for 5 hours at room temperature, sodium cyanoborate (0.5 g) is added in an ice bath and the plate is left alone for 12 hours at room temperature. This substrate is rinsed with methanol to obtain the target silicone material modified with the PC group.

Example 1-11

Commercially available monomer 1 (5 g), monomer 2 (n=2) (5 g), and butylmethacrylate (5 g) are dissolved in tetrahydrofuran (100 ml), followed by deaeration for 30 minutes in a nitrogen atmosphere. The temperature is raised up to 70° C. and azobisisobutyronitrile (5 mg) is added, followed by 4 hours of polymerization. The reaction solution is diluted with chloroform and then put into a tube (Teflon (registered trademark) tube) that is to be subjected to the surface modification. One end of the tube is sealed and the solvent is removed from the other end over several hours by means of pressure reduction. A dimethylformamide solution (100 ml) containing PC1 (1 g) and triethylamine (1 g) is prepared and this solution is fed through the tube at a velocity of 1 cm per minute for 5 hours. After this, methanol and acetone are fed through the tube to obtain the target tubing whose inside surface is modified with the PC group. For the sake of letting the cross-linking reaction proceed sufficiently on the inside surface, water can be fed through the tube and then again the tube can be dried by means of pressure reduction.

A tube whose inside surface is modified with the PC group can be obtained in the same manner when Tefzel tubes, PEEK resin tubes, and fused silica tubes, which are different materials, are used.

Example 1-12

The polymer of Example 1-11 is similarly diluted with chloroform and then put into a tube (Tefzel tube) that is to be subjected to the surface modification. One end of the tube is sealed and the solvent is removed from the other end over several hours by means of pressure reduction. A solution containing triethylamine is fed through the tube at a velocity of 1 cm per minute for 5 hours to advance the cross-linking reaction and also to convert isocyanate to amine. Methanol (100 ml) containing PC2 (1 g) is fed through this tubing for 5 hours and then methanol (100 ml) containing sodium cyanoborate (0.5 g) is fed through it at an icy temperature; the tubing is then left alone with the liquid sealed in it for 12 hours at room temperature. The inside of the tube is then rinsed with methanol to obtain a tubing whose inside surface is modified with the PC group.

A tubing whose inside surface is modified with the PC group can be obtained in the same manner when Teflon (registered trademark) tubes, PEEK resin tubes, and fused silica tubes, which are different materials, are used.

Example 1-13

Commercially available monomer 1 (5 g), monomer 3 (n=1) (15 g), hydroxyethyl methacrylate (5 g), and trimethyl ammonium ethyl acrylate (1 g) are dissolved in ethanol (200 ml), followed by deaeration for 30 minutes in a nitrogen atmosphere. The temperature is raised up to 70° C. and azobisisobutyronitrile (5 mg) is added, followed by 4 hours of polymerization. The reaction solution is diluted with chloroform and then put into a tube (PEEK resin tube) that is to be subjected to the surface modification. One end of the tube is sealed and the solvent is removed from the other end over several hours by means of pressure reduction. For the purpose of cross-linking the inside surface of this tubing and converting epoxy groups to amino groups, aqueous ammonia is fed through it for 5 hours at 50° C. After methanol is fed through this tube, methanol (100 ml) containing PC2 (1 g) is fed through it for 5 hours and then methanol (100 ml) containing sodium cyanoborate (0.5 g) is fed through it at an icy temperature; the tube is then left alone with the liquid sealed in it for 12 hours at room temperature. After this, the inside of the tube is rinsed with methanol to obtain the target tubing material modified with the PC group.

A tubing whose inside surface is modified with the PC group can be obtained in the same manner when Teflon (registered trademark) tubes, Tefzel tubes, and fused silica tubes, which are different materials, are used.

Example 1-14

Commercially available monomer 1 (5 g), monomer 4 (n=2) (2 g), methyl methacrylate (10 g), and dimethylpolysiloxane methacrylate (3 g) are dissolved in ethanol (100 ml)/hexane (50 ml), followed by deaeration for 30 minutes in a nitrogen atmosphere. The temperature is raised up to 70° C. and azobisisobutyronitrile (5 mg) is added, followed by 4 hours of polymerization. The reaction solution is diluted with chloroform and then put into a tube (fused silica tube) that is to be subjected to the surface modification. One end of the tube is sealed and the solvent is removed from the other end over several hours by means of pressure reduction. Water is then fed through this tubing for 5 hours at room temperature to cross-link the inside of it. After drying this tubing, methanol (100 ml) containing PC2 (1 g) is fed through it for 5 hours and then methanol (100 ml) containing sodium cyanoborate (0.5 g) is fed through it at an icy temperature; the tubing is then left alone with the liquid sealed in it for 12 hours at room temperature. After this, the inside of the tube is rinsed with methanol to obtain the target tubing material modified with the PC group.

A tubing whose inside surface is modified with the PC group can be obtained in the same manner when Teflon (registered trademark) tubes, Tefzel tubes, PEEK resin tubes, which are different materials, are used.

[2: Invention Defined by a Modified Powder]

Example 2-1

Figure 5:
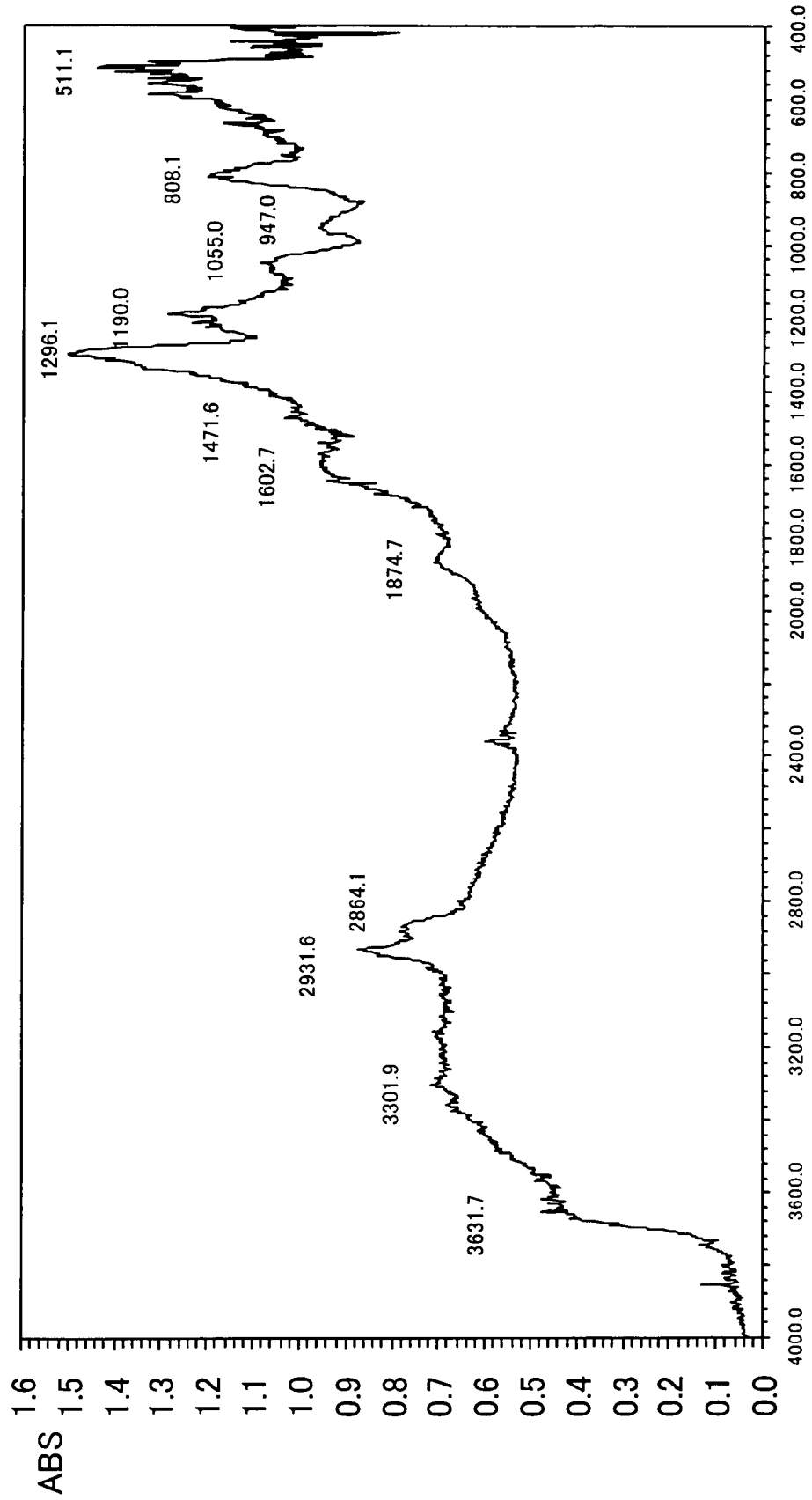
FIG. 5 is a FT-IR spectrum of the silica gel to which the amino group is introduced, as described in Example 2-1.

Silica Gel Containing Phosphorylcholine Groups 10 g of silica gel having an average size of 5 micrometers (pore size 80 angstroms) is dispersed in water (15 ml)/2-propanol (15 ml), to which 3-aminopropylmethoxysilane (5 g) is added, and the temperature is raised to 100° C. and the reaction is carried out for 6 hours. After cooling down to room temperature, the silica gel is filtered, rinsed, and dried under a reduced pressure to obtain silica to which amino groups have been introduced. A transmission type FT-IR spectrum of this silica is shown in FIG. 5.

This silica gel is dispersed in 100 ml of methanol and mixed with 10 g of the compound obtained in Synthetic example 1, followed by stirring for 6 hours at room temperature. This mixed solution is then cooled in an ice bath, 3 g of sodium cyanotrihydroborate is added to it, and stirring is carried out overnight at room temperature; the silica gel is then filtered, rinsed with methanol, and dried under a reduced pressure to obtain 10.6 g of silica gel having the target phosphorylcholine groups directly on the surface. A FT-IR spectrum of this silica gel is shown in FIG. 6.

Figure 6:
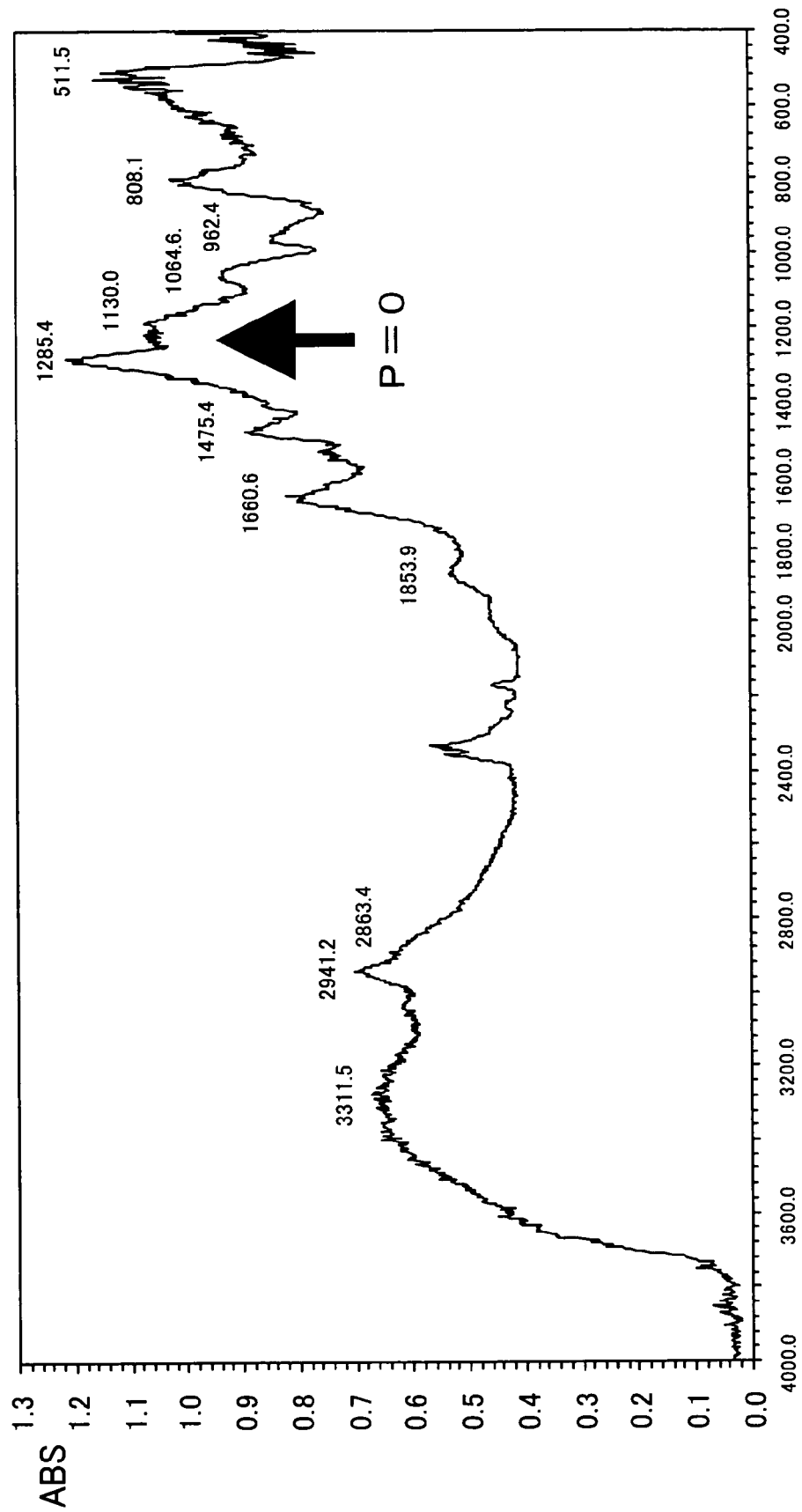
FIG. 6 is a FT-IR spectrum of the phosphorylcholine group-containing silica of Example 2-1.

FIG. 6 shows that a peak due to phosphate groups appears around 1,250 cm$^{-1}$, which indicates that the phosphorylcholine group is introduced onto the powder surface.

The element analysis values of the powder are shown, too.

TABLE 2-1

|  | C | H | N |
|---|---|---|---|
| 3-aminopropyltrimethoxysilane | 7.27 | 2.05 | 2.49 |
| Modified powder of Example 1: Measured values | 10.76 | 2.05 | 3.80 |
| Calculated values | 11.30 | — | 3.56 |

The element analysis values shown above indicate that the phosphorylcholine group has been nearly quantitatively introduced to the modified powder of Example 2-1.

The modified silica powder of the present invention has a superior effect in that the phosphorylcholine group is stable on the powder surface even after being held in a polar solvent such as acetone. In contrast, silica coated with a homopolymer and copolymer of 2-methacryloyloxyethyl phosphorylcholine cannot stably keep the phosphorylcholine group bonded to the powder due to elution of the coated polymer off of the powder surface. Also, since the silica surface is coated with the polymer, the original characteristics of the silica surface are altered by the characteristics of the polymer itself.

Example 2-2

N-isopropylacrylamide/Acrylic Acid Copolymer Particles Containing Phosphorylcholine Groups Sodium dodecylsulfate (20 mg), N-isopropylacrylamide (2.7 g), acrylic acid (172 mg), and methylenebisacrylamide (121 mg) are dissolved in 200 ml of water, and, after a 30 minute stirring at 70° C. in a nitrogen atmosphere, a polymerization initiator (potassium persulfate 9.2 mg) is added, followed by 4 hours of stirring. The obtained particles (precursor of Example 2-2) are purified in water by means of dialysis, and then lyophilized. These particles (700 mg) are then dispersed in tetrahydrofuran (30 ml)/dimethylformamide (10 ml), and a tetrahydrofuran (10 ml)/dimethylformamide (50 ml) solution of dicyclohexylcarbodiimide (800 mg), hydroxybenzotriazole (500 mg), and 2,2'-(ethylenedioxy)bis(ethylamine) (1.14 g) is added at room temperature, followed by an overnight stirring. The particles are then dialyzed and lyophilized. They are dispersed in methanol (70 ml), to which 1 g of the chemical compound of Synthetic example 1 is added, followed by a 6 hour stirring at room temperature; this mixture is cooled in an ice bath, 2.8 g of sodium cyanotrihydroborate is added, followed by an overnight stirring at room temperature. The obtained particles are dialyzed in water to obtain the target N-isopropylacrylamide/acrylic acid copolymer particles (620 mg) having phosphorylcholine groups directly on the particle surface.

Example 2-3

N-isopropylacrylamide/Acrylic Acid Copolymer Particles Containing Phosphorylcholine Groups Sodium dodecylsulfate (20 mg), N-isopropylacrylamide (2.4 g), acrylic acid (382 mg), and methylenebisacrylamide (121 mg) are dissolved in 200 ml of water, and, after a 30 minute stirring at 70° C. in a nitrogen atmosphere, a polymerization initiator (potassium persulfate 9.2 mg) is added, followed by 4 hours of stirring. The obtained particles (precursor of Example 3) are purified in water by means of dialysis, and then lyophilized. These particles (700 mg) are then dispersed in tetrahydrofuran (30 ml)/dimethylformamide (10 ml), and a tetrahydrofuran (10 ml)/dimethylformamide (50 ml) solution of dicyclohexylcarbodiimide (800 mg), hydroxybenzotriazole (500 mg), and 2,2'-(ethylenedioxy)bis(ethylamine) (1.14 g) is added at room temperature, followed by an overnight stirring. The particles are then dialyzed and lyophilized. They are dispersed in methanol (70 ml), to which 1.2 g of the chemical compound of Synthetic example 1 is added, followed by a 6 hour stirring at room temperature; this mixture is cooled in an ice bath, and 3 g of sodium cyanotrihydroborate is added, followed by an overnight stirring at room temperature. The obtained particles are dialyzed in water to obtain the target N-isopropylacrylamide/acrylic acid copolymer particles (650 mg) containing phosphorylcholine groups.

Figure 7:
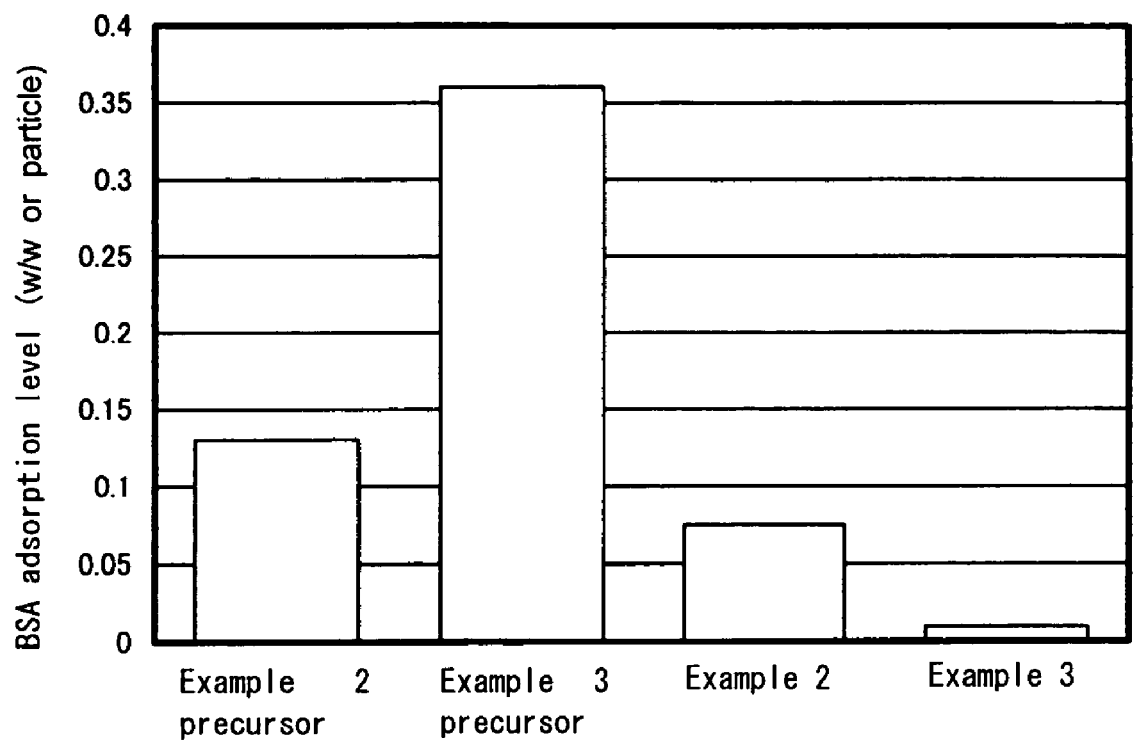
FIG. 7 is a graph showing the BSA adsorption level.

2 mg of particles obtained in Example 2-2 and Example 2-3 respectively is dispersed in 2 ml of a 5 mmol bovine serum albumin solution in a 2-(N-morpholino) ethane sulfonic acid buffer (pH 5), and, after being left alone overnight, the particles are removed by means of centrifugation, and the BSA concentration of the supernatant was quantified by using UV absorption ($\lambda$=280 nm). The result are shown in FIG. 7.

The precursor of Example 2-2 and the precursor of Example 2-3, which do not have phosphorylcholine groups, adsorb a large amount of BSA, and Example 2-2 and Example 2-3, to which phosphorylcholine has been added, exhibit a reduction in the adsorption level. Also, Example 2-3, which has a higher introduction rate of the phosphorylcholine group, inhibits the adsorption of the BSA more effectively.

[3: Invention Defined by a Chromatography Packing]

Example 3-1

Chromatography Packing

Preparation of a silica gel carrier bonded with phosphorylcholine groups (pore size 300 angstroms)

Figure 8:
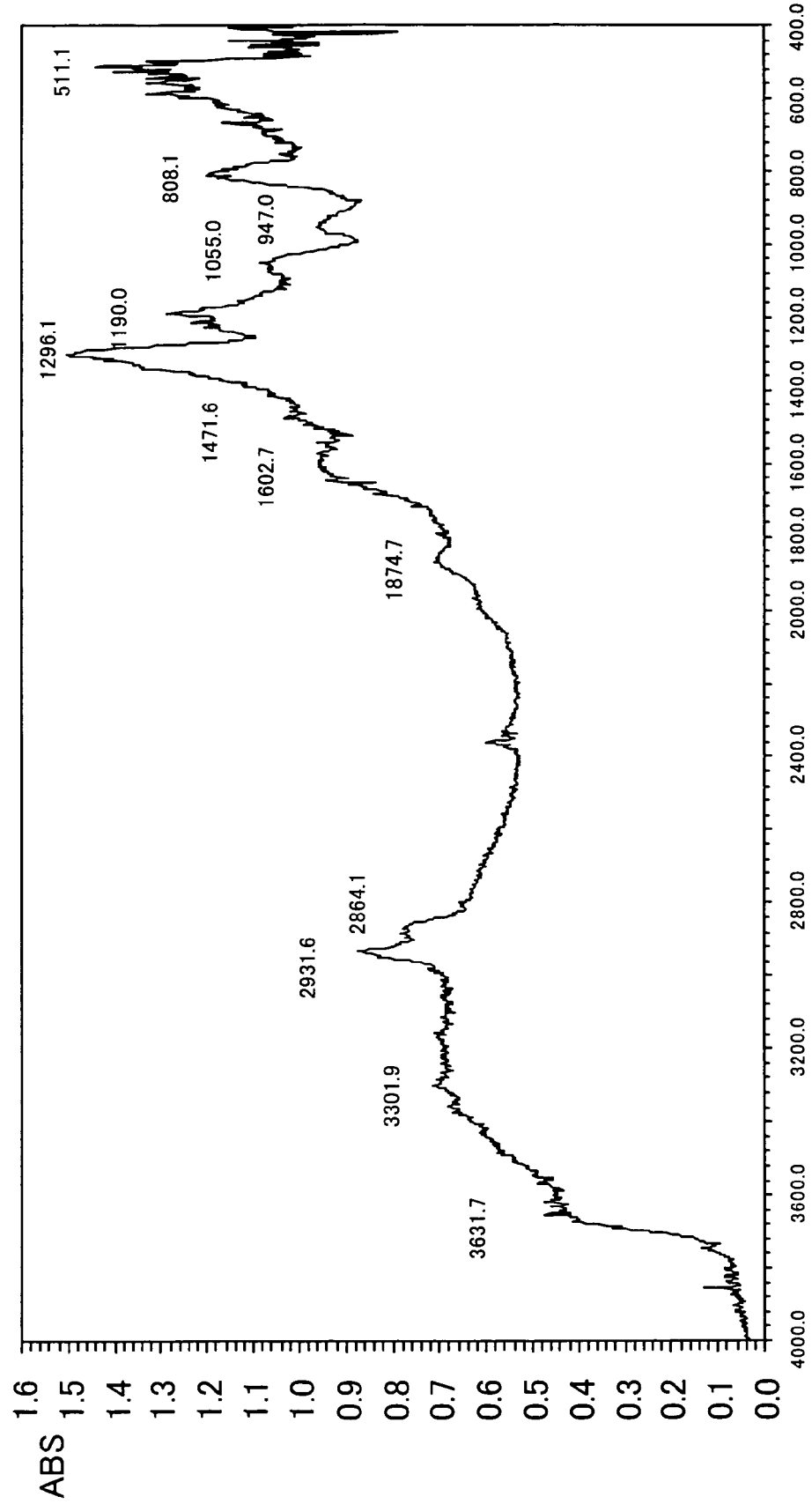
FIG. 8 is a FT-IR spectrum of the silica gel to which the aminopropyl group is introduced as described in Example 3-1.

10 g of silica gel having an average size of 5 micrometers and an average pore size of 300 angstroms is dispersed in water (15 ml)/2-propanol (15 ml), to which 3-aminopropylmethoxysilane (5 g) is added, and the temperature is raised to 100° C. and the reaction is carried out for 6 hours. After cooling down to room temperature, the silica gel is filtered, rinsed, and dried under a reduced pressure to obtain silica gel to which aminopropyl groups have been introduced. A reflection FT-IR spectrum of this silica gel is shown in FIG. 8.

This silica gel to which aminopropyl groups have been introduced is dispersed in 100 ml of methanol and mixed with 10 g of the compound obtained in Synthetic example 1, followed by stirring for 6 hours at room temperature. This mixed solution is then cooled in an ice bath, 3 g of sodium cyanotrihydroborate is added to it, and stirring is carried out overnight at room temperature; the silica gel is then filtered, rinsed with methanol, and dried under a reduced pressure to obtain 10.3 g of silica gel having the target phosphorylcholine groups directly on the surface. A reflection FT-IR spectrum of this silica gel is shown in FIG. 9.

Figure 9:
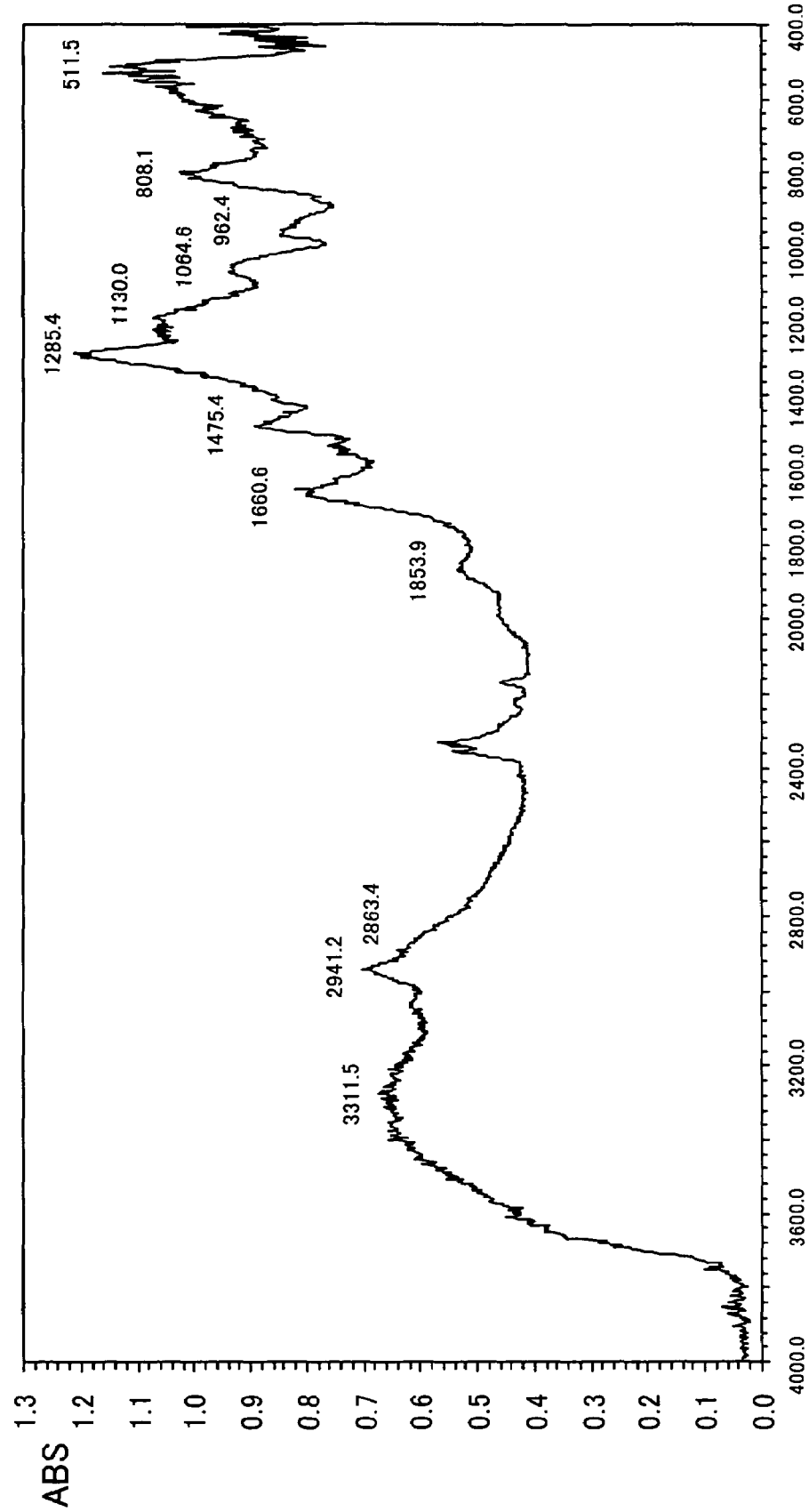
FIG. 9 is a FT-IR spectrum of the silica gel to which the phosphorylcholine group is introduced as described in Example 3-1.

FIG. 9 shows that a peak due to phosphate groups appears around 1,250 cm$^{-1}$, which indicates that the phosphorylcholine group is introduced onto the powder surface.

The element analysis values of the powder obtained by the aforementioned procedure are shown in Table 3-1.

TABLE 3-1

|  | C/% | N/% |
|---|---|---|
| Silica gel to which aminopropyl groups have been introduced | 3.24 | 1.36 |
| Silica gel to which phosphorylcholine groups have been introduced, obtained in Example 1 | 5.49 | 1.49 |
| Theoretical values when phosphorylcholine groups reacted to all the aminopropyl groups | 9.13 | 2.04 |

The element analysis values shown above indicate that the phosphorylcholine group has been introduced to the surface of the powder of Example 3-1. It is also shown that approximately 38% of the total amino groups actually reacted with phosphorylcholine groups.

Figure 10:
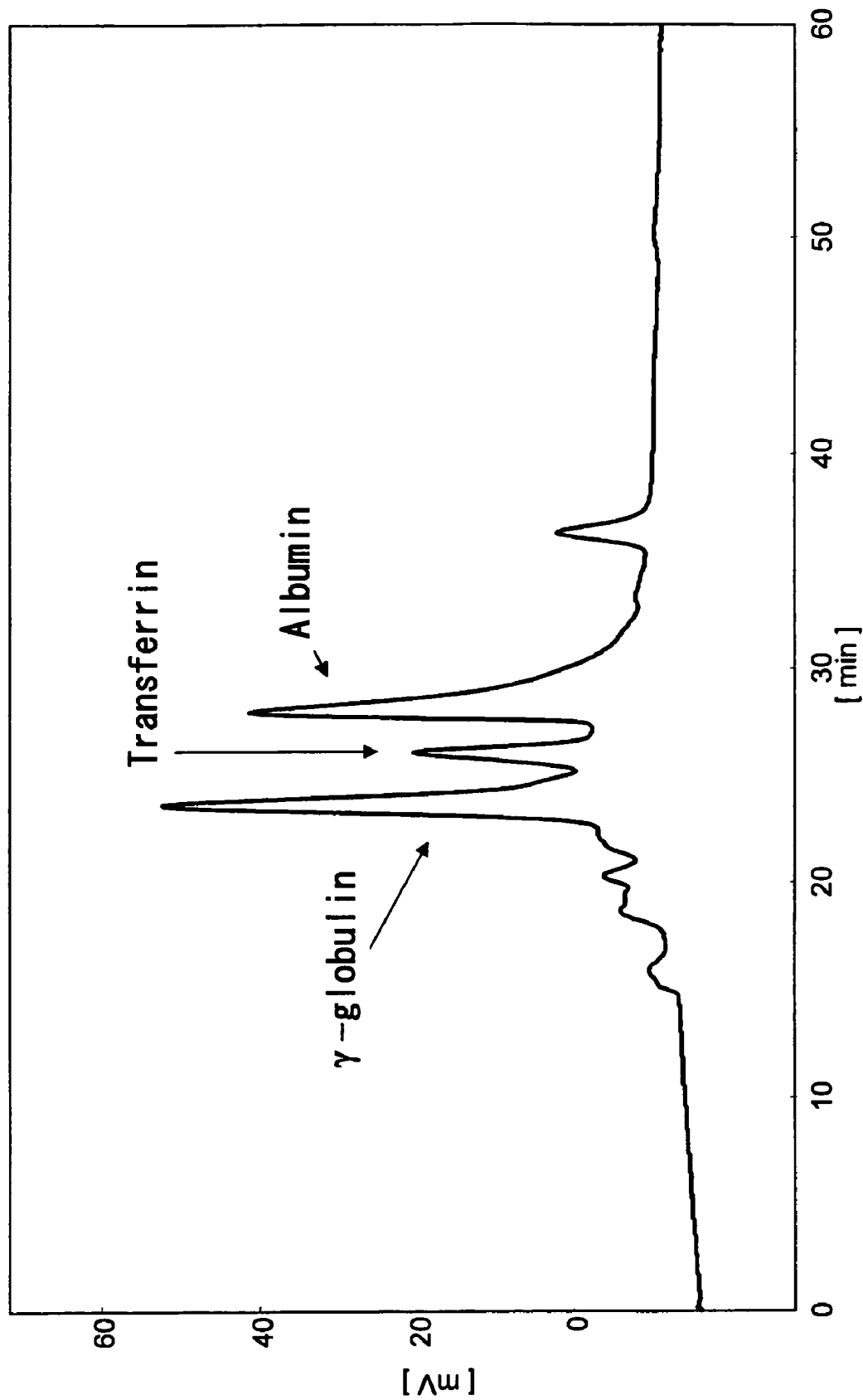
FIG. 10 is a chromatogram of the liquid chromatography wherein separation of human serum proteins is carried out using the chromatography packing of the present invention.

The chromatography packing of Example 3-1 is packed in a 250 mm-long stainless steel column having an inside diameter of 4.6 mm by means of the slurry method. Separation of proteins in a human serum sample (Consera N, product name, is diluted two times with physiological saline) is attempted with the following setup: a 50 mmol/l phosphate buffer (prepared from $Na_2HO_4$ and $KH_2PO_4$) having 500 mmol/l sodium chloride is used for the mobile phase and the flow rate is set at 0.1 ml/min and the column oven temperature at 40° C. The detection was done with the UV at 280 nm. The result is shown in FIG. 10.

Comparative Example 3-1

Separation of proteins in a human serum sample (Consera N, product name, is diluted two times with physiological saline) is attempted by using a commercial chromatography column (YMC-Pack Diol 300 from YMC Co. Ltd.) off the shelf. The column in this Comparative example has the same inner diameter and length as the column mentioned in Example 1.

This packing is described as a packing for the size exclusion mode that has chemically bonded functional groups having the diol structure on the surface of porous silica gel. Its average pore size is 300 angstroms and the average particle size is 5 micrometers, which makes it preferable for comparison with the packing described in Example 3-1. It is described as suitable for separation of proteins having a molecular weight of 10,000 to several hundred thousand. YMC-Pack Diol uses nondessociative diol as the hydrophilic group and therefore, unlike the packing of the present invention, does not have electrically charged functional groups. Therefore, very little ionic interactions with proteins are expected.

In the same manner as in Example 3-1, separation of proteins in a human serum sample (Consera N, product name, is diluted two times with physiological saline) is attempted with the following setup: a 50 mmol/l phosphate buffer (prepared from $Na_2HO_4$ and $KH_2PO_4$) having 500 mmol/l sodium chloride is used for the mobile phase and the flow rate is set at 0.1 ml/min and the column oven temperature at 40° C. The detection was done with the UV at 280 nm. The result is shown in FIG. 10.

A substantial characteristic of the chromatogram that uses the chromatography packing of the present invention (FIG. 10) is that transferrin is separated out in addition to γ-globulin and albumin, which are major proteins in human serum. The peak assignment was carried out by using a commercially available sample of each protein.

When the conventional chromatography packing is used (FIG. 9), the separation between albumin and transferrin is incomplete. This was confirmed by the fact that commercially obtained samples of these proteins separately show the same elution time. The molecular weights of albumin and transferrin are approximately 69,000 and 75,000 respectively, indicating they have similar molecular weights. Conventional GFC columns cannot separate samples with similar molecular weights, such as albumin and transferrin. The chromatography packing of the present invention is shown not only to have very little protein adsorption but also to be able to separate proteins having similar molecular weights based on the difference in the isoelectric point and hydrophobicity because it has subtle ionic interactions with proteins due to the dual electric charge of the phosphorylcholine group. That is, the chromatography packing of the present invention is shown to be able to separate samples in the GFC mode based not only on the difference in the molecular weight but also on the difference in the isoelectric point and hydrophobicity.

Example 3-2

Chromatography Packing

Preparation of a silica gel carrier bonded with phosphorylcholine groups (pore size 120 angstroms)

Using porous silica gel having an average particle size of 5 micrometers and an average pore size of 120 angstroms, a silica gel carrier bonded with phosphorylcholine groups is prepared by means of the same treatment as in Example 1. This is used to pack an identical column as in Example 3-1.

Figure 12:
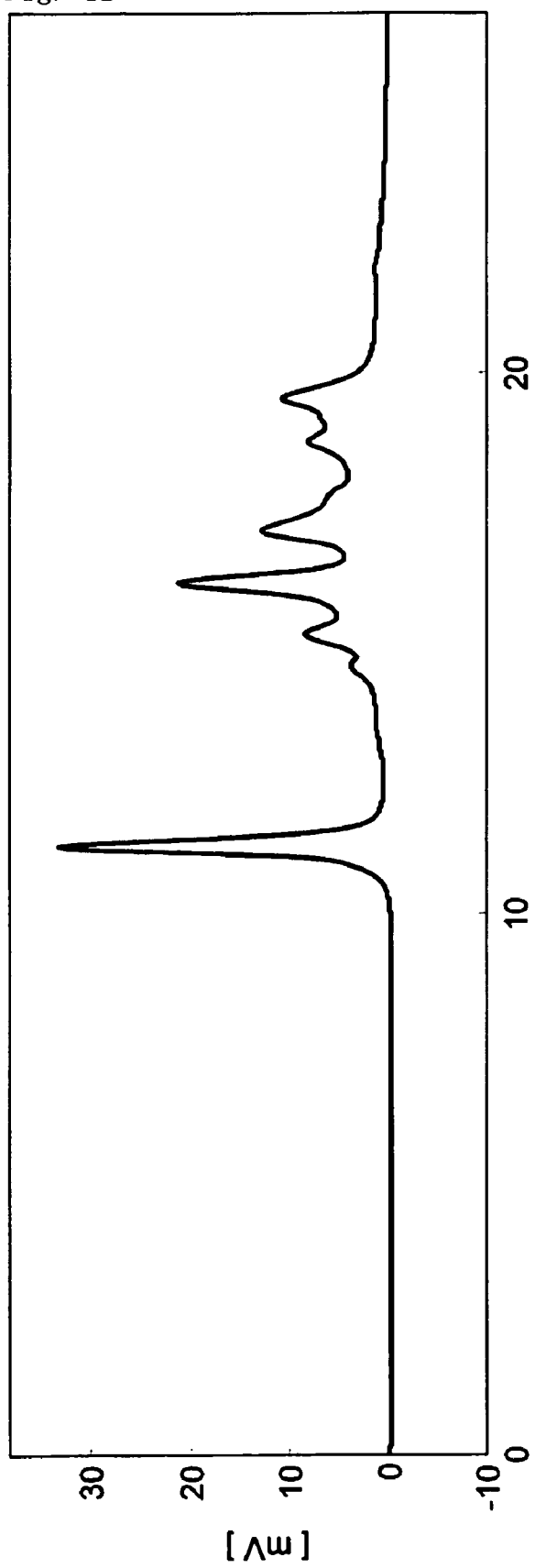
FIG. 12 is a chromatogram of the liquid chromatography wherein separation of tryptic digestion products of myoglobin is carried out using the chromatography packing of the present invention.

Separation of peptides produced by tryptic digestion of myoglobin is attempted with the following setup: a 50 mmol/l phosphate buffer (prepared from $Na_2HO_4$ and $KH_2PO_4$) having 500 mmol/l sodium chloride is used for the mobile phase and the flow rate is set at 0.2 ml/min and the column oven temperature at 40° C. The detection was done with the UV at 280 nm. The result is shown in FIG. 12.

The procedure for the tryptic digestion of myoglobin is shown below. 8.8 mg of myoglobin crystals (commercial product) is dissolved in a 20 mol/l (pH 8.3) phosphate buffer (prepared with $Na_2HPO_4$ and $KH_2PO_4$). Trypsin crystals (commercial product) are dissolved in a 5 mol/l (pH 5.0) phosphate buffer (prepared with $Na_2HPO_4$ and $KH_2PO_4$). 360 microliters of the phosphate buffer solution of myoglobin is heated up to 95° C. in a hot water bath for thermal denaturation for 1 hour. The trypsin solution then centrifuged at 3,000 rpm for 15 minutes and the precipitation is separated. 360 microliters of the supernatant of the sample after the centrifugation is sampled, to which 80 microliters of the trypsin solution described above is added, and the mixture is incubated for 5 hours at 35° C. to obtain a tryptic digest. The digest is then filtered with a filter having a pore size of 0.2 micrometers to obtain a sample.

Figure 11:
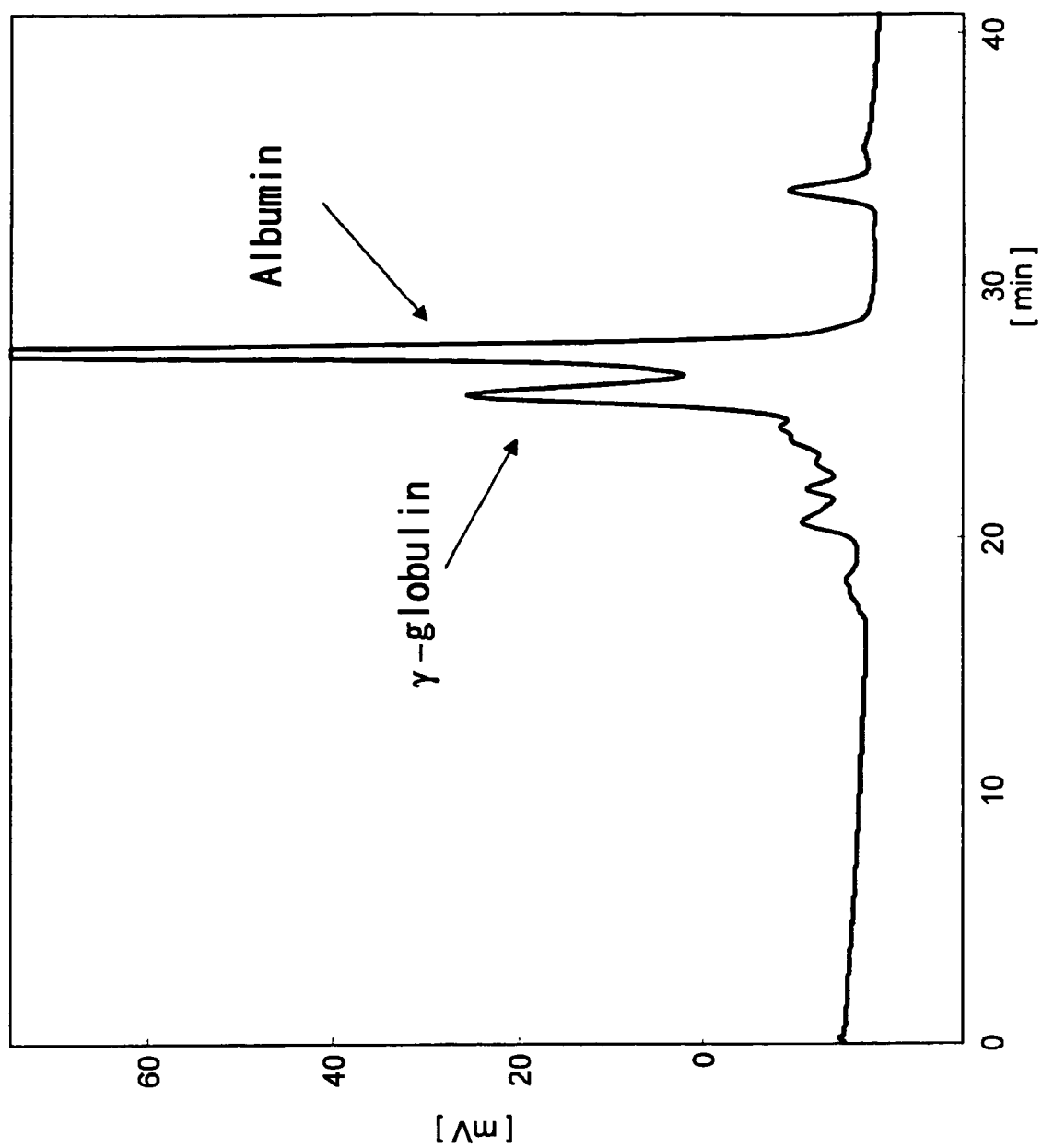
FIG. 11 is a chromatogram of the liquid chromatography wherein separation of human serum proteins is carried out using a conventional chromatography packing.

The chromatogram using the chromatography packing of the present invention (FIG. 11) shows that polypeptides produced by tryptic digestion of myoglobin are separated.

[4: Invention Defined by a Liquid Contact Member]

Example 4-1

Commercially available monomer 1 (5 g, n=3), monomer 2 (5 g, n=2), and butylmethacrylate (5 g) are dissolved in tetrahydrofuran (100 ml), followed by deaeration for 30 minutes in a nitrogen atmosphere. The temperature is raised up to 70° C. and azobisisobutyronitrile (5 mg) is added, followed by 4 hours of polymerization. The reaction solution is diluted with chloroform and then put into a tube (Teflon (registered trademark) tube) that is to be subjected to the inner surface coating. One end of the tube is sealed and the solvent is removed from the other end over several hours by means of pressure reduction. A dimethylformamide solution (100 ml) containing PC1 (1 g) and triethylamine (1 g) is prepared and this solution is fed through the tube at a velocity of 1 cm per minute for 5 hours. After this, methanol and acetone are fed through the tube to obtain the target tubing whose inner surface is modified with the PC group. For the sake of letting the cross-linking reaction proceed sufficiently on the inside surface, water can be fed through the tube and then again the tube can be dried by means of pressure reduction.

A tubing whose inside surface is modified with the PC group can be obtained in the same manner when Tefzel tubes, PEEK resin tubes, and fused silica tubes, which are different materials, are used.

Example 4-2

The polymer of Example 4-1 is similarly diluted with chloroform and then put into a tube (Tefzel tube) that is to be subjected to the inner surface coating. One end of the tube is sealed and the solvent is removed from the other end over several hours by means of pressure reduction. A solution containing triethylamine is fed through the tube at a velocity of 1 cm per minute for 5 hours to advance the cross-linking reaction and also to convert isocyanate to amine. Methanol (100 ml) containing PC2 (1 g) is fed through this tubing for 5 hours and then methanol (100 ml) containing sodium cyanoborate (0.5 g) is fed through it at an icy temperature; the tube is then left alone with the liquid sealed in it for 12 hours at room temperature. The inside of the tube is then rinsed with methanol to obtain a tubing whose inside surface is modified with the PC group.

A tubing whose inside surface is modified with the PC group can be obtained in the same manner when Teflon (registered trademark) tubes, PEEK resin tubes, and fused silica tubes, which are different materials, are used.

Example 4-3

Commercially available monomer 1 (5 g, n=3), monomer 3 (15 g, n=1), hydroxyethyl methacrylate (5 g), and trimethyl ammonium ethyl acrylate (1 g) are dissolved in ethanol (200 ml), followed by deaeration for 30 minutes in a nitrogen atmosphere. The temperature is raised up to 70° C. and azobisisobutyronitrile (5 mg) is added, followed by 4 hours of polymerization. The reaction solution is diluted with chloroform and then put into a tube (PEEK resin tube) that is to be subjected to the inner surface coating. One end of the tube is sealed and the solvent is removed from the other end over several hours by means of pressure reduction. For the purpose of cross-linking the inside surface of this tubing and converting epoxy groups to amino groups, aqueous ammonia is fed through it for 5 hours at 50° C. After methanol is fed through this tube, methanol (100 ml) containing PC2 (1 g) is fed through it for 5 hours and then methanol (100 ml) containing sodium cyanoborate (0.5 g) is fed through it at an icy temperature; the tube is then left alone with the liquid sealed in it for 12 hours at room temperature. After this, the inside of the tube is rinsed with methanol to obtain the target tubing material modified with the PC group.

A tubing whose inside surface is modified with the PC group can be obtained in the same manner when Teflon (registered trademark) tubes, Tefzel tubes, and fused silica tubes, which are different materials, are used.

Example 4-4

Commercially available monomer 1 (5 g, n=3), monomer 4 (2 g, n=2), methyl methacrylate (10 g), and dimethylpolysiloxane methacrylate (3 g) are dissolved in ethanol (100 ml)/hexane (50 ml), followed by deaeration for 30 minutes in a nitrogen atmosphere. The temperature is raised up to 70° C. and azobisisobutyronitrile (5 mg) is added, followed by 4 hours of polymerization. The reaction solution is diluted with chloroform and then put into a tube (fused silica tube) that is to be subjected to the inner surface coating. One end of the tube is sealed and the solvent is removed from the other end over several hours by means of pressure reduction. Water is then fed through this tubing for 5 hours at room temperature to cross-link the inside of it. After drying this tubing, methanol containing PC2 (1 g) is fed through it for 5 hours and then methanol (100 ml) containing sodium cyanoborate (0.5 g) is fed through it at an icy temperature; the tubing is then left alone with the liquid sealed in it for 12 hours at room temperature. After this, the inside of the tube is rinsed with methanol to obtain the target tubing material modified with the PC group.

A tubing whose inside surface is modified with the PC group can be obtained in the same manner when Teflon (registered trademark) tubes, Tefzel tubes, PEEK resin tubes, which are different materials, are used.

[5: Invention Defined by a Filter]

Example 5-1

A Borosilicate Glass Fiber Filter Material (Preparation of a Borosilicate Glass Fiber Filter Carrier Bonded with Phosphorylcholine Groups)

15 g of ion-exchanged water, 15 g of 2-propanol, and 1 g of 3-aminopropylmethoxysilane are put into a 100 mL conical flask. 5 sheets of borosilicate glass fiber filter (glass fiber filter grade GF/F) from Whatman Japan Co. Ltd. are added to this, followed by heating up to 100° C. and 5 hours of reflux boiling. After cooling the temperature down to room temperature, the filters are strained, rinsed, and dried under a reduced pressure to obtain borosilicate glass fiber filters to which aminopropyl groups have been directly introduced.

The borosilicate glass fiber filters to which aminopropyl groups have been directly introduced are then put into 100 ml of methanol, mixed with 1 g of the chemical compound obtained in Synthesis example 1, and left stationary for 5 hours at room temperature. This mixed solution is then cooled in an ice bath, 0.3 g of sodium cyanotrihydroborate is added to it, and stirring is carried out overnight at room temperature; the filters are then strained, rinsed with methanol, and dried under a reduced pressure to obtain borosilicate glass fiber filters having the target phosphorylcholine groups directly on their surface.

Comparative Experiment 10 mg of bovine serum albumin (BSA) is dissolved in 100 mL of phosphate buffer (prepared by dissolving 1 tablet of PBS from Takara Bio Co. Ltd. in distilled water and adjusting the total volume to be 100 mL: pH 7.4-7.5) to obtain a BSA solution. 2.0 g of the BSA solution is put into each of 3 polypropylene 30 mL sample tubes; the borosilicate glass fiber filter prepared in Example 5-1 (PC-treated filter) is put into one of the sample tubes and immersed, and an untreated borosilicate glass fiber filter (untreated filter) is put into another of the sample tubes and immersed. They are left alone for 24 hours at room temperature (25° C.); the Lowry method is used to color the BSA solution sampled from each of the 3 sample tubes and the BSA adsorption level on the filters is quantified by means of absorption spectrophotometry. The results are shown in Table 5-1.

TABLE 5-1

Comparison of BSA adsorption level

| Sample | BSA adsorption level (mg/sheet) |
|---|---|
| Untreated filter | 36.6 |
| PC-treated filter | 17.1 |

The results shown in Table 5-1 indicate that the borosilicate glass fiber filter of the present invention has a reduced BSA adsorption level compared with the untreated filter.

Example 5-2

Alumina Filter Material

An alumina filter material is prepared in 20 the same manner as in Example 5-1 except for the fact that alumina membrane filters from Whatman Japan Co. Ltd. (ANOPORE™, pore size 0.02 micrometers, diameter 25 mm) are used instead of the borosilicate glass fiber filters.

Preparation 5-1 Preparation of Anode Oxidation Alumina

A 99.99% aluminum plate is immersed in acetone for a day for degreasing; after electrolytic polishing, anode oxidation is carried out for 5 hours at 16° C. and 40V in a 0.5 mol/L oxalic acid bath. After the completion of the anode oxidation, the plates are immersed in a chrome oxide/phosphoric acid solution for 15 hours to remove the alumina layer formed on the aluminum surface; after this, anode oxidation is once again carried out for 5 hours at 16° C. and 40V in a 0.5 mol/L oxalic acid bath. After this, aluminum is completely removed by means of immersion in a saturated solution of mercury chloride (II) for several hours, and the barrier layer at the bottom of the alumina is removed by means of an ion milling apparatus, for example, to prepare porous alumina having fine pores of approximately 60 nm.

Example 5-3

An Anode Oxidation Alumina Filter Material

An anode oxidation alumina filter material is prepared in the same manner as in Example 5-1 except for the fact that an anode oxidation alumina filter (15×30 mm) is used instead of the borosilicate glass fiber filter.

INDUSTRIAL APPLICABILITY

The modification method of the present invention allows stable introduction of phosphorylcholine groups onto the surface of various materials using a simple method. It has a great advantage in that an optimum amount of the phosphorylcholine group can be easily introduced on the material that is used for a specific application for easy modification suitable for the application. The material whose surface is modified has high biocompatibility and hydrophilicity and is useful for medical materials, cosmetic ingredients, chromatography packing materials, etc. It is also useful for modification of members of a separation analysis apparatus.

Even when a specific polymer coating is applied to the modification method of the present invention, a simple method can be used to introduce hydrophilic phosphorylcholine groups onto the material in a stable manner. In particular, a piping for an analysis apparatus or separation apparatus and/or various materials for an analysis apparatus that have phosphorylcholine groups introduced onto the inside surface exposed to sample liquid prevent protein adsorption and allow protein analysis with superior reproducibility. It is also possible to suppress protein denaturation in an analysis apparatus to improve the protein recovery rate. The material to be modified can be anything, and, since the polymer coating is cross-linked, durability of the coating is superior. Furthermore, since the phosphorylcholine group is introduced by means of a polymer reaction after the polymer coating, an optimum amount of phosphorylcholine groups can be easily introduced onto the surface of various liquid-contacting members.

The modified powder of the present invention is a powder having phosphorylcholine groups on the powder surface in a stable manner that has high biocompatibility and moisture retention and has various application areas such as cosmetic ingredients, column chromatography packings, and medical fine particles.

The preparation method of the present invention has a great advantage in that an optimum amount of the phosphorylcholine group for a specific application can be easily introduced onto the powder surface so that the modified powder can be easily designed.

According to the present invention, a chromatography packing with very little adsorption of proteins and polypeptides, and yet slightly electrically charged, can be provided.

The characteristic of the chromatography packing of the present invention is its superior ability to separate samples in the GFC mode based not only on the differences in the molecular weight but also on the differences in the isoelectric point and hydrophobicity.

It has particularly superior separation characteristics in the GFC mode.

According to the present invention, a simple method can be used to introduce hydrophilic phosphorylcholine groups onto the surface of liquid-contacting members of various materials in a stable manner. In particular, a piping for an analysis apparatus or separation apparatus and/or various materials for an analysis apparatus that have phosphorylcholine groups introduced onto the inside surface exposed to sample liquid prevent protein adsorption and allow protein analysis with superior reproducibility. It is also possible to suppress protein denaturation in an analysis apparatus to improve the protein recovery rate.

The liquid-contacting member of the present invention is not selective about its material. Also, since the polymer is cross-linked after coating, the coating has superior durability. Furthermore, since the phosphorylcholine group is introduced by means of a polymer reaction after the polymer coating, an optimum amount of phosphorylcholine groups can be easily introduced onto the surface of various liquid-contacting members.

The present invention provides a filter material with very little adsorption of proteins and polypeptides.

The filter material of the present invention is useful for filtration of a wide range of biological substances; examples include separation and concentration of antibodies, enzymes and the like, and blood purification and analysis such as blood dialysis and blood filtering.

The invention claimed is:

1. A chromatography packing comprising:
   a silica gel carrier comprised of porous spherical particles having an average particle size of 1-200 micrometers and an average pore size of 1-2000 angstroms, said carrier having a carrier surface having phosphorylcholine groups, represented by the following formula (3-1):

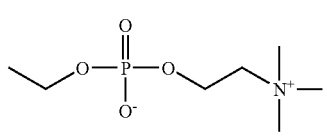

(3-1)

wherein amino groups are directly introduced to the carrier surface, and then an aldehyde derivative obtained by the oxidative ring-opening reaction of glycerophosphorylcholine is reacted with said amino groups, so as to directly chemically bond the phosphorylcholine groups to the carrier surface.

* * * * *